J. BATH.
GRINDING MACHINE.
APPLICATION FILED FEB. 1, 1909.
1,036,544.
Patented Aug. 27, 1912.
9 SHEETS—SHEET 4.
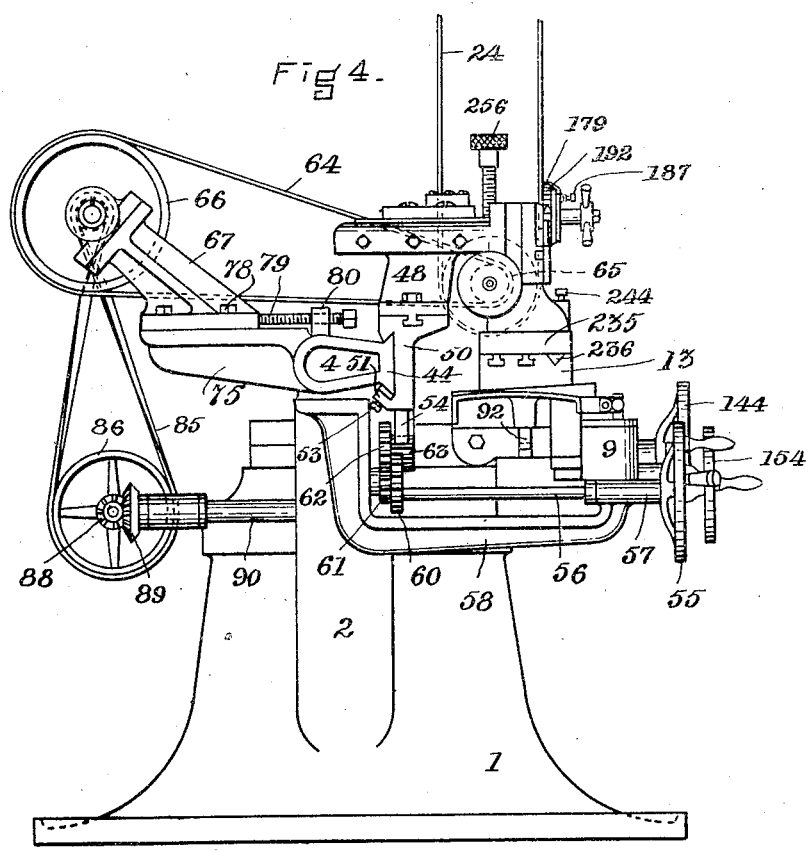
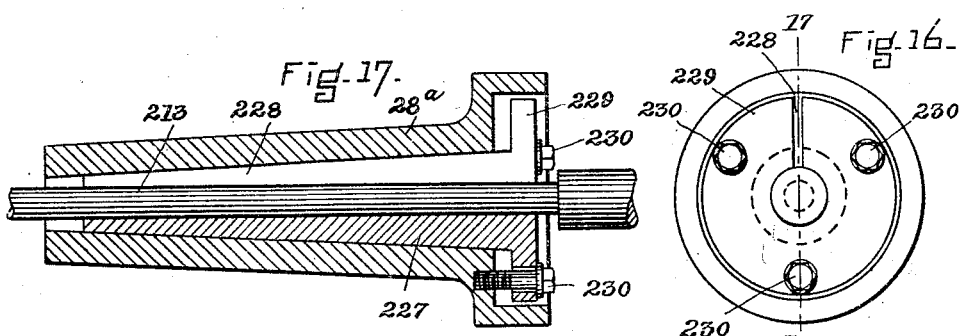
WITNESSES
F. R. Ronlstone
E. Batchelder
INVENTOR
John Bath J. BATH.
GRINDING MACHINE.
APPLICATION FILED FEB. 1, 1909.
1,036,544.
Patented Aug. 27, 1912.
9 SHEETS—SHEET 5.
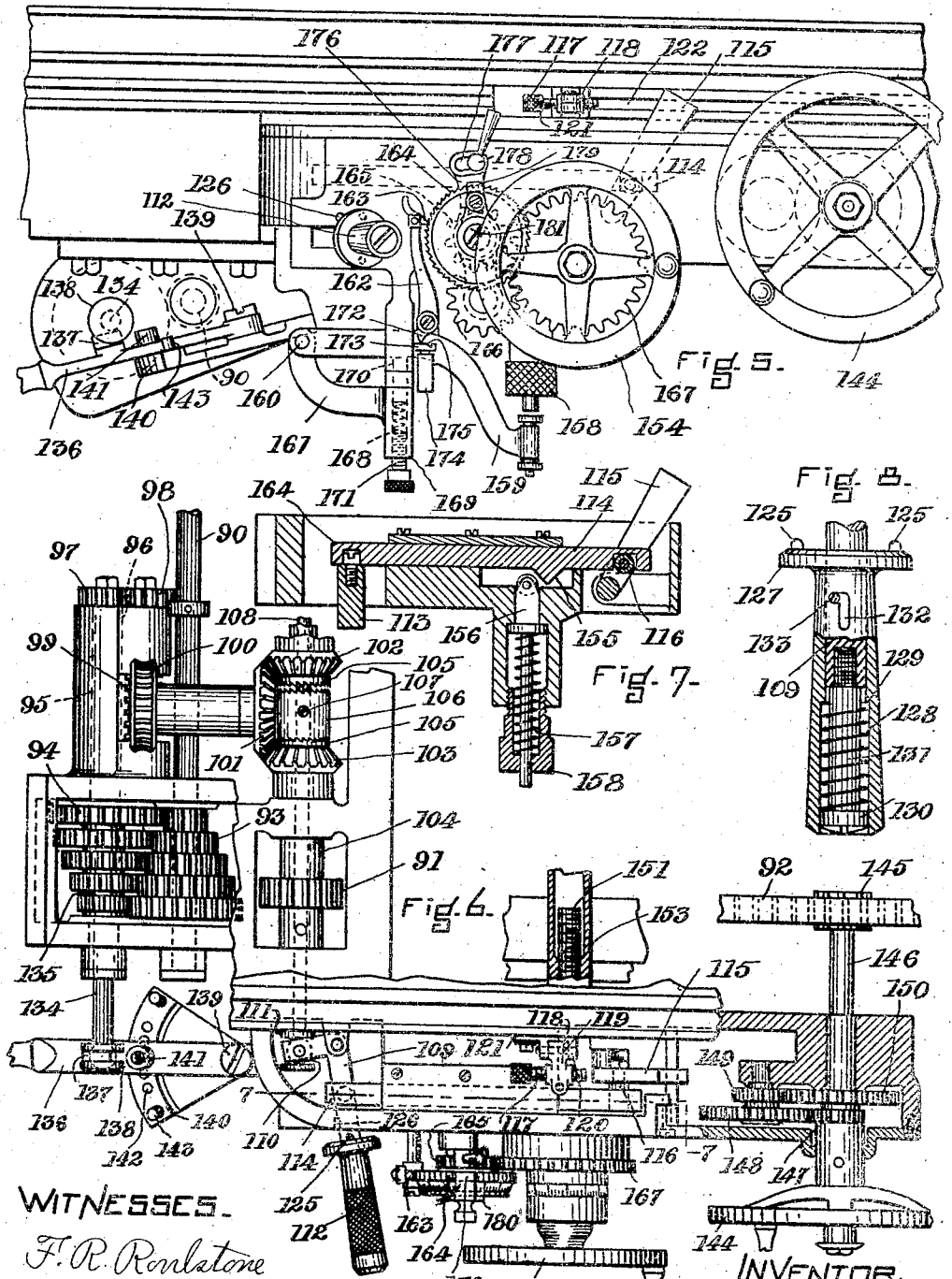

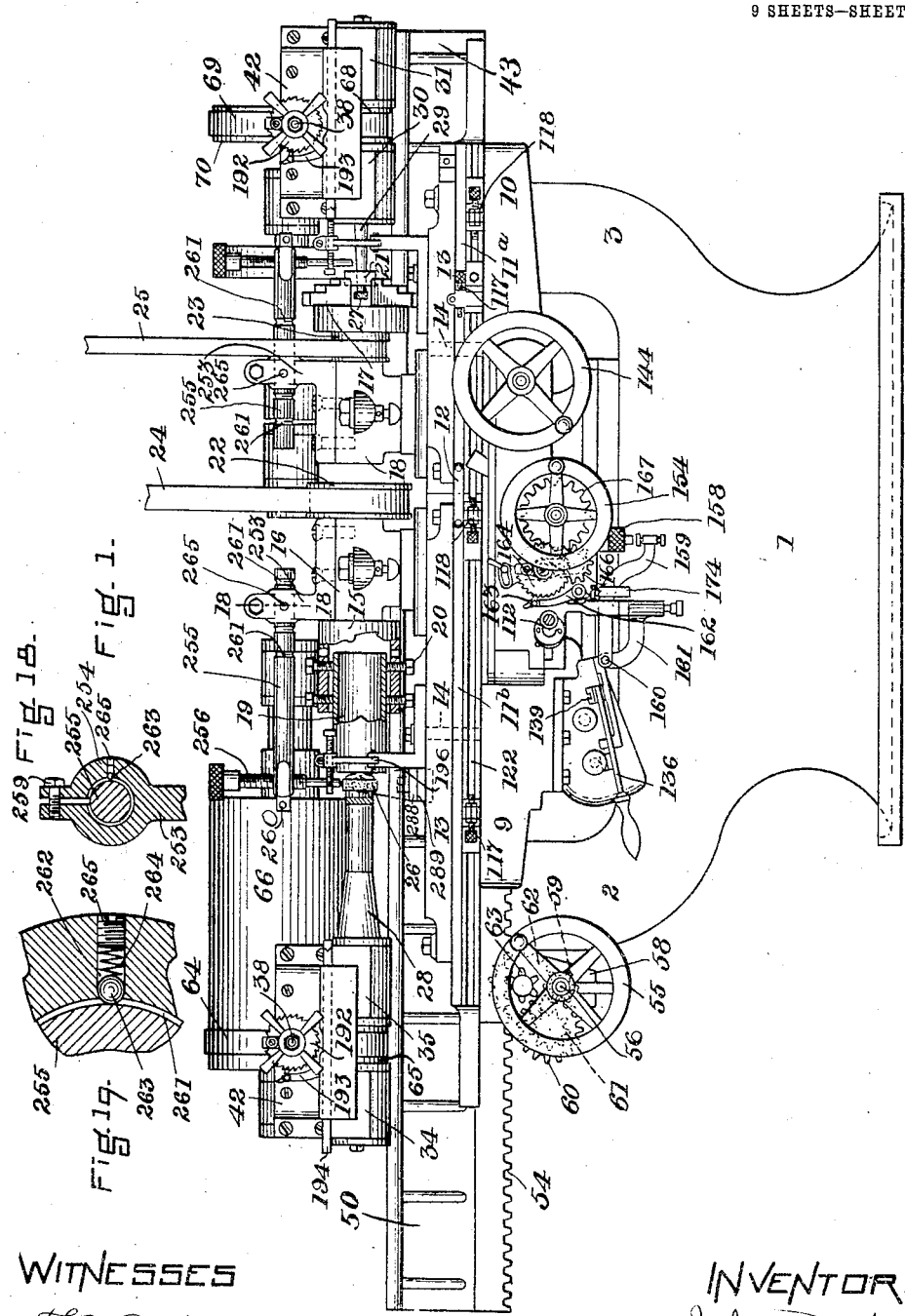

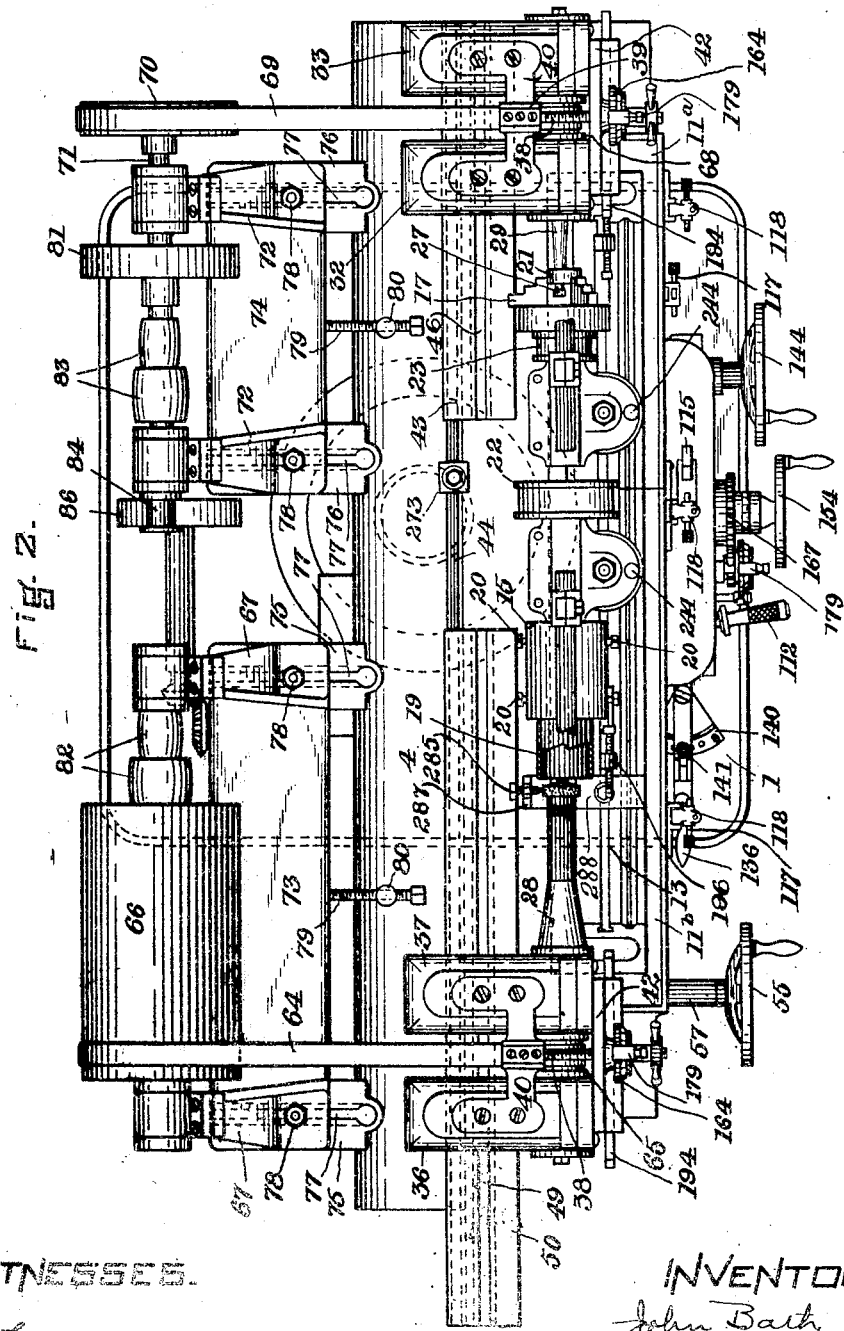

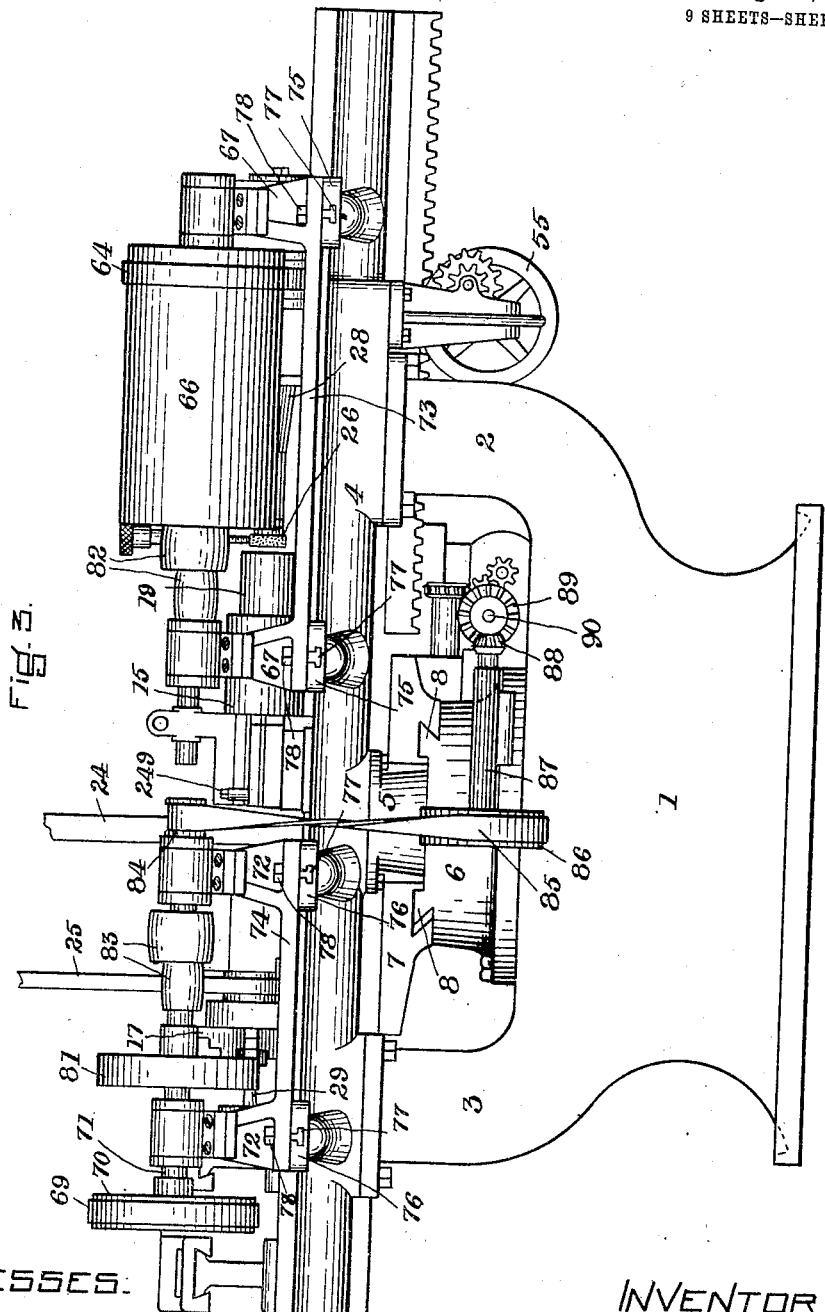

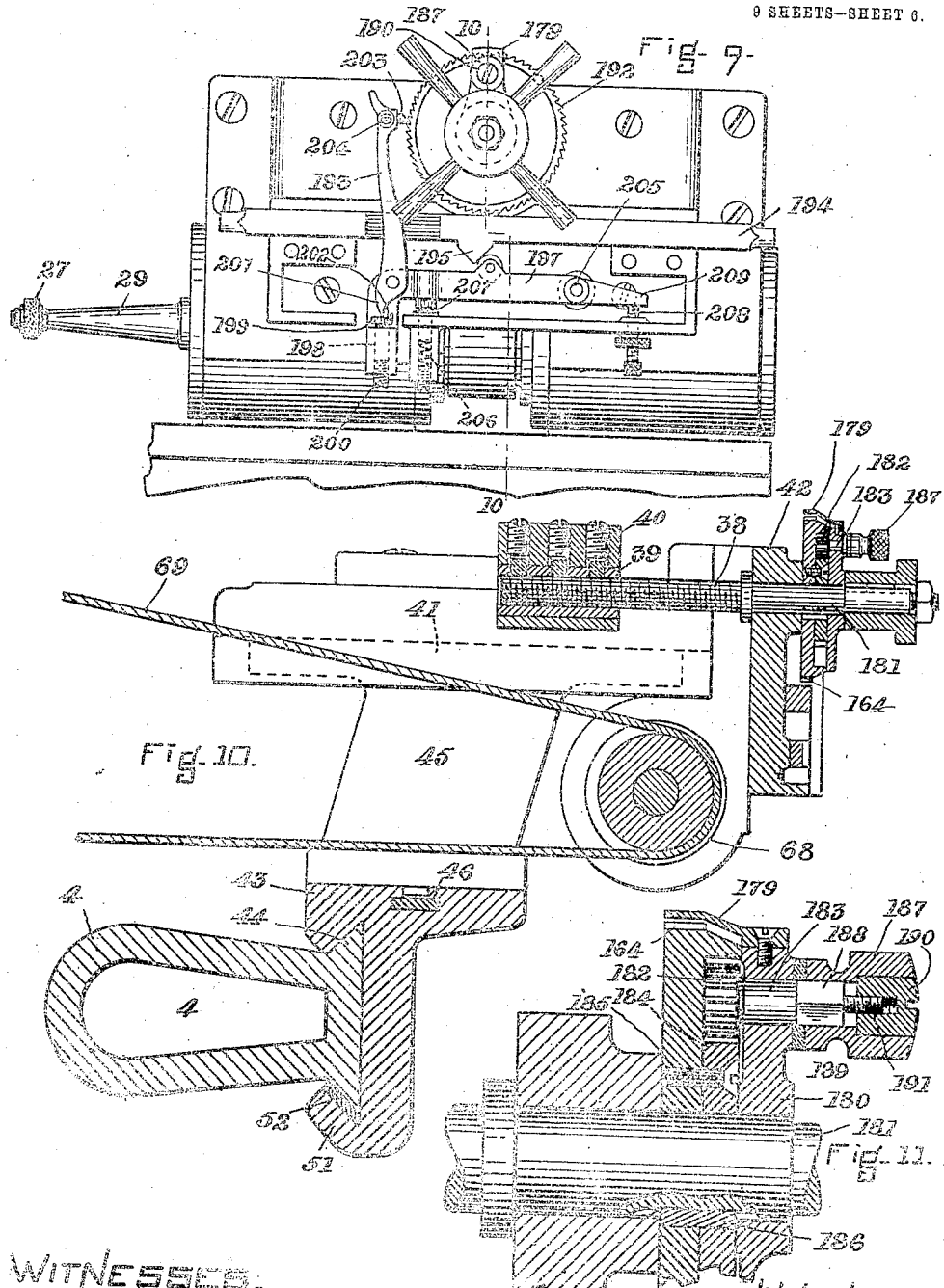

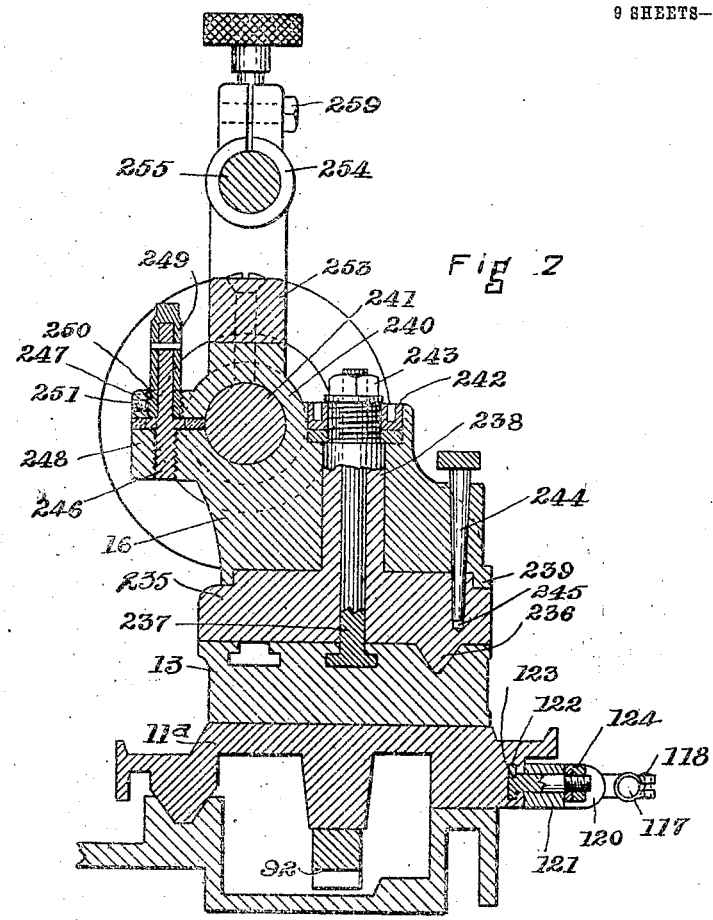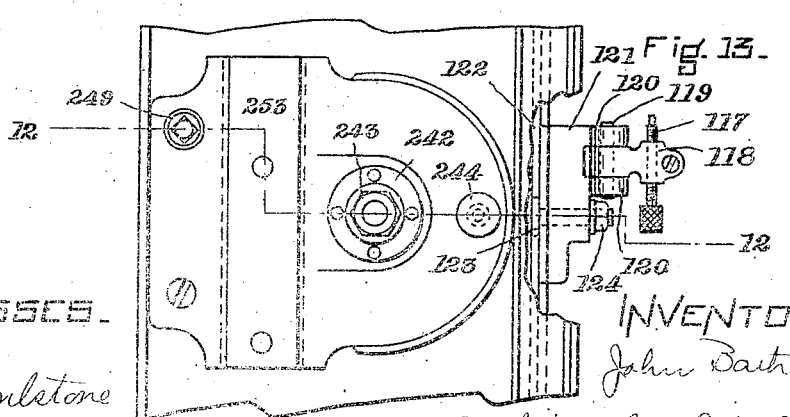

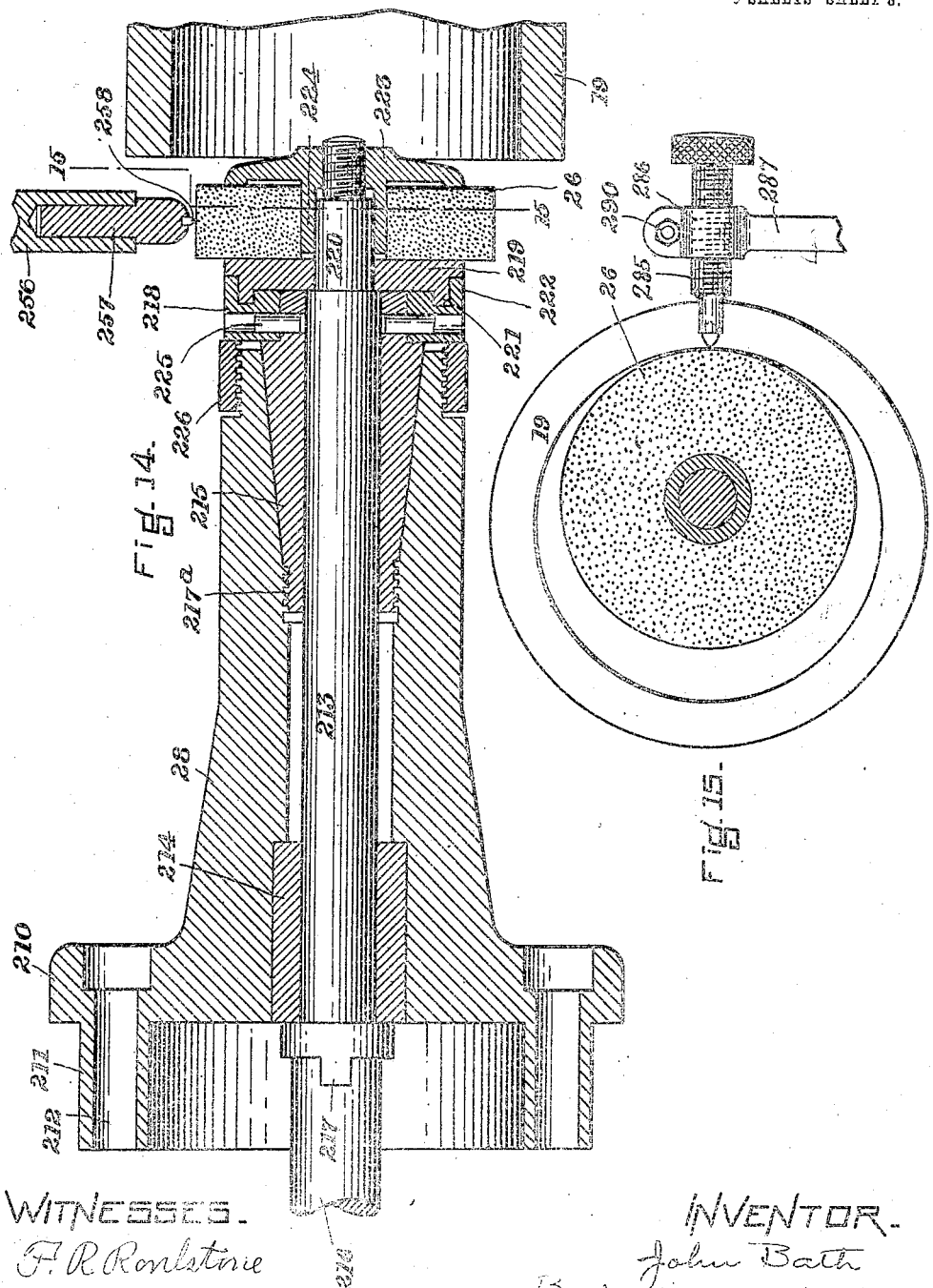

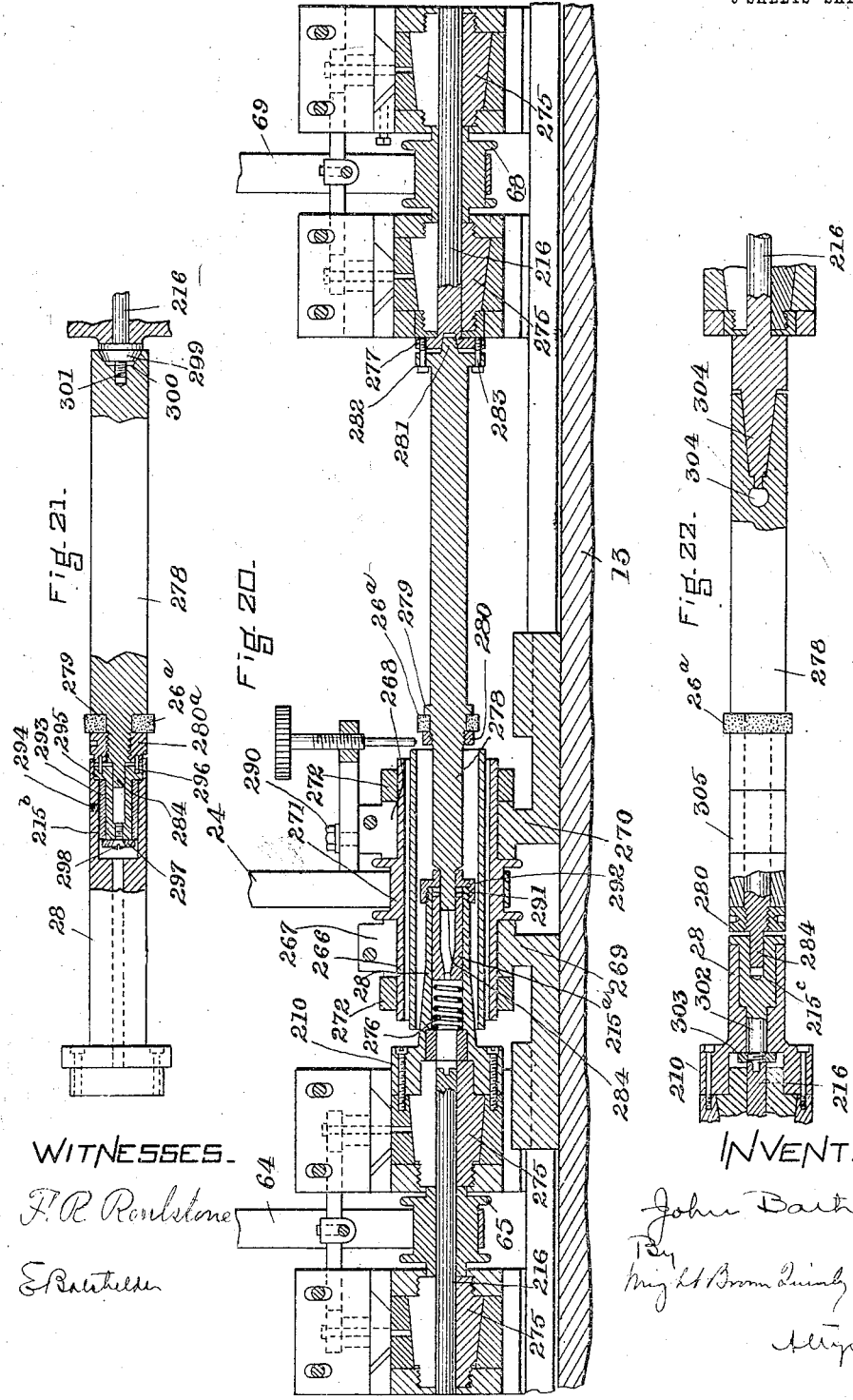

UNITED STATES PATENT OFFICE.

JOHN BATH, OF FITCHBURG, MASSACHUSETTS, ASSIGNOR TO BATH GRINDER COMPANY, OF FITCHBURG, MASSACHUSETTS, A CORPORATION OF MASSACHUSETTS.

GRINDING-MACHINE.

1,036,544.  Specification of Letters Patent.  Patented Aug. 27, 1912.

Application filed February 1, 1909. Serial No. 475,421.

*To all whom it may concern:*

Be it known that I, JOHN BATH, of Fitchburg, in the county of Worcester and State of Massachusetts, have invented certain new and useful Improvements in Grinding-Machines, of which the following is a specification.

This invention relates to grinding machines, and has particular reference to machines of the character illustrated and described in my pending application for patent Serial No. 385,007, filed July 22, 1907.

In its general character the present machine is similar to that of the application above referred to, but it has in addition improved features and novel details of construction by which the output of the machine may be increased, and the convenience and ease of operating the machine also augmented.

The objects of this invention include among other things, to permit work of different characters to be performed at one time, to provide a means of stopping the operation of the machine after the work has been ground down to a predetermined limit, regardless of the wear which may have taken place in the meantime in the grinding wheel, to provide sliding holders for the counter shafts which furnish the driving power for the grinding wheels, at the same time furnishing an additional means of adjustment for the driving belts, and to provide many other improvements in constructive detail and mode of operation, as will appear from the following specification and claims.

Of the accompanying drawings,—Figure 1 represents a front elevation of my improved type of grinding machine. Fig. 2 represents a plan view of the same. Fig. 3 represents a rear elevation. Fig. 4 represents an end elevation as seen from the left of Fig. 1. Fig. 5 represents an elevation on an enlarged scale, of the mechanism for moving the cross feed carriage. Fig. 6 represents a plan view of the same, showing also the variable speed driving and reversing mechanism for the work table or bed. Fig. 7 represents a vertical sectional view illustrating the dog-controlled means for reversing the work table feed. Fig. 8 represents a sectional plan view of the handle by which the work table feed is manually controlled. Fig. 9 represents an elevation of one of the spindle heads. Fig. 10 represents a sectional view on line 10—10 of Fig. 9. Fig. 11 represents a sectional detail view on an enlarged scale, of the adjusting device for the feed knock-off shield. Fig. 12 represents a vertical cross sectional view of one of the work holders. Fig. 13 represents a plan view of the same. Fig. 14 represents a sectional view of one of the grinding wheels and the supporting bearing therefor, the driving spindle being shown in elevation. Fig. 15 represents an elevation showing the relation of the grinding wheel to the work when acting on a hollow work piece. Figs. 16 and 17 represent respectively, an elevation and a longitudinal section of a modified form of grinder spindle bearing. Figs. 18 and 19 are detail sectional views showing a device for retaining the truing tool holder, permitting its displacement and accurate return to position, the latter figure being on an enlarged scale. Fig. 20 represents a sectional view showing a single work holder adapted to hold one or more work pieces of the same or different characters, showing also how the machine may be adapted for the employment of a grinder bar supported at both ends. Figs. 21 and 22 represent modifications of Fig. 20, showing different ways of supporting the grinder bar or arbor to diminish heating of the bearing.

The same reference characters indicate the same parts in all the figures.

The machine comprises a base 1 on the opposite side of which rise columnar arms 2 and 3 which also branch outwardly from the base. Across the tops of these arms and united thereto extends a tubular arm or cross web 4 which has a guideway to support slidingly the slides on which are mounted the brackets and bearings carrying the grinder spindles. Between the arms 2 and 3 is a third arm 5 which supports the beam or web 4 intermediately. This construction, as will be evident, supplies the maximum of strength and rigidity. Between the horizontal beam and the top of the base or pedestal 1 there is a space which is in part occupied by a standard 6 mounted on the pedestal, and a cross feed carriage 7. The standard 6 has ways 8 which occupy undercut grooves in the carriage, the latter being provided with two rearwardly extending arms, one on each side of the post 5. This portion of the carriage lies under the cross beam 4, and thus the carriage is enabled to travel back and forth in a direction perpendicular to that in which the work travels while being ground, in order to give the necessary depth feed to the work. The parts last described are seen in Fig. 3.

The front of the carriage is provided with laterally extending arms 9 and 10 which have guides supporting the reciprocatory lower bed or table which travels on such guides in the direction necessary to carry the work past the grinding wheels, which is approximately perpendicular to the forward and back feeding movement of the carriage.

Preferably the lower bed is made in two parts 11ᵃ and 11ᵇ, one of which is driven by mechanism to be described, and the other of which is connected detachably to the former by means, such as a link 12, which may be disconnected for a purpose to appear hereinafter. On each of the parts of the lower bed is an upper bed or platen 13 centrally swiveled, by means of a pivot 14, to the lower bed. If desired, the lower bed may be made in one piece, and in this case there will be but one platen 13 equal in length to the combined length of the two platens shown in Fig. 1, and pivoted in its center. The pivoting of the upper bed or base enables it or them to be slightly inclined so as to grind taper work.

The holder or holders for the work may be of various characters. In Fig. 1, two forms of work holders are shown. One of these is a sleeve 15 journaled in a pivoted bracket 16 which is supported on the left-hand upper table or platen 13, while the other is a chuck 17 of common construction, having a bearing in a similar bracket 18 mounted upon the other bed or platen. The work carried by the holder 15 is a tube or sleeve 19 secured in the holder by set screws 20, while the work adapted to be secured in the other holder consists of collars or such short pieces, designated by the numeral 21. The work is constantly rotated while being acted upon, suitable means for accomplishing this result consisting of pulleys 22 23 secured to the shafts of the work holders and driven by means such as belts 24 25.

The grinding wheels for the work pieces are represented at 26 and 27 respectively, the former of which is mounted in a tubular bearing bracket 28 which projects longitudinally on the bed and of the direction of travel of the work from its supporting means. A similar bearing bracket, but permissibly of a different size and designated by 29, supports and provides a bearing for the spindle of the second grinding wheel 27. The spindle for this grinding wheel passes through bearings 30 and 31 which are secured to forwardly and rearwardly adjustable slides 32 and 33, as in my pending application above referred to. The other grinder spindle is similarly mounted in bearings 34 35 attached to similar slides 36 37. Each pair of slides and with them the bearings, are adjustable back and forth by means of a screw 38 engaging a nut 39 held in a yoke 40 which bridges the slides and passes through slots therein, being secured to the guideways 41 on which the slides travel. The forward end of the screw has a bearing in a plate 42 secured to both the bearings of the set. The bearings for each grinder spindle constitute a spindle head, and both spindle heads are alike. That for the right-hand spindle is mounted upon a slide 43 which travels upon the guideway 44, forming the front face of the horizontal cross web or beam, the brackets 45 which carry the guides 41 for the spindle head slides being adjustably secured in a slot 46 of such slide 43. As appears from Figs. 4 and 10, the guideway 44 has the form of the usual dove-tail or undercut guide, but occupies a position at right angles to that usually assumed by such guides, so that the broadest face thereof is vertical, and one of its edges is directly above the other. This upper edge extends horizontally and guides the slide, the latter being caused by its weight to bear against such edge. Thereby displacement of the slide out of its correct path of movement is impossible without the exercise of sufficient force upwardly to overcome its weight, which, under ordinary working conditions, would never be applied. The guideways for the other spindle head are mounted on similar brackets 48 which are adjustable in a longitudinal slot 49 of a slide 50 which rests on and similarly grasps the guideway at the left-hand end of the cross beam. Each slide has a lip 51 embracing the lower edge of the guideway and containing a plate 52 which may be clamped against the guideway by screws 53 so as to lock the slide in any position.

The left-hand slide has a set of rack teeth 54 on its lower edge by which force may be imparted to move it along its guide. The means for applying such force is a hand wheel 55 at the front of the machine, and at the left of the cross-feed carriage. This hand wheel is mounted on the end of a shaft 56 journaled in a bearing 57 at the end of an arm 58 which depends from the cross beam near its left-hand end and extends to the front of the machine. The rear end of the shaft 56 carries a pinion 59, and through the medium of gears 60 61 and 62, drives a pinion 63 which meshes with the rack. This gearing enables the operator of the machine to shift the slide and the left-hand grinding wheel while standing at the front of the machine in position to attend to the other mechanisms thereof.

Each spindle is continuously rotated while in operation. The left-hand spindle and tool are driven by a belt 64 which passes over a pulley 65 secured to the spindle between its bearings, and over a driving drum 66 on a countershaft having its bearings in brackets 67 67. The other grinding wheel is driven by a pulley 68, belt 69 and pulley 70 on a second countershaft 71 carried in brackets 72. Each countershaft and the pair of brackets which supports it is independent of the other, but the brackets of each pair are connected by webs 73 and 74. The former of these is supported by arms 75 secured to and extending rearwardly from the beam 4, while the other countershaft holder is mounted upon similar arms or brackets 76. These arms or brackets 75 and 76 are preferably cast integral with the beam 4 and have undercut slots 77 in which are contained the heads of bolts 78 by which the countershaft holders are clamped to the brackets. Each holder may be adjusted outwardly by a screw 79 passing through a stud 80 formed upon the beam 4 and bearing against the web of the holder. The two countershafts are separate and so also are their holders, so that each is capable of independent adjustment to maintain the requisite tension of the belts 64 and 69, respectively. The belt 64 is subject to greater stretch than the other belt, for the reason that it is caused to travel along the drum 66 with the back and forth movements of the slide in the ordinary conditions of use, while the belt 69 travels ordinarily in one plane. The slide 50 which carries the left-hand grinding wheel is moved back and forth whenever finished work is removed from the machine and new work substituted, and also at other times it is necessary to displace the tool for taking measurements. By moving the grinding wheel 26 far enough to the left, not only the left-hand work piece may be measured and removed from its holder, but the bed as a whole may be moved far enough to the left to clear the right-hand work piece from its grinder. Thus frequent adjustments of the right-hand grinder are unnecessary, while on the other hand, it is necessary often to move the left-hand grinder back and forth. If desired, this capability of the left-hand grinding wheel to be moved longitudinally while at the same time being rapidly rotated, may be utilized in the regular grinding operation, either in conjunction with the longitudinal travel of the work, or while the work is held stationary. By rotating the hand wheel 55 at a uniform rate, the wheel may be moved longitudinally back and forth across the face of the work, and either the wheel or the work, or both, may be fed transversely between the grinding movements.

Adjustments of the machine for various kinds of work are made possible by having more than one driving pulley on the countershaft 71, so that the grinder 27 may be put in different positions. For this purpose the countershaft 71 is shown as having not only the pulley 70 but also a second pulley 81, and other pulleys of similar character may be mounted upon this countershaft if desired, to permit still further adjustments of the grinder. These pulleys are detachably connected with the shaft, being loosely mounted thereon and adapted to be clamped by friction binding means, such for instance as the cone friction on the pulley and a nut secured to the shaft and adapted to be clamped against the friction cone. The countershafts are provided with step pulleys 82 and 83 (Fig. 2) respectively, by which they may be driven by belting from the main source of power.

The countershaft 71 not only drives the grinder 27 rotatively, but also furnishes the power by which the longitudinal reciprocating movements of the bed and the work holders are effected. On the shaft is a pulley 84 from which a belt 85 conveys power to a pulley 86 on a shaft beneath, this shaft being contained in a bearing 87 secured to the standard 6. On the shaft is a pinion 88 meshing with a gear 89 on a shaft 90, which, through a system of variable-speed and reverse gearing, drives a gear 91 (see Fig. 6) in mesh with a rack 92 (Fig. 4). This gear train is shown in Fig. 6, and consists of a series of gears 93 of graduated diameters secured to the shaft 90 in mesh with complemental gears 94 loosely mounted upon a parallel shaft 95, which shaft drives a third shaft 96 through pinions 97 and 98. Shaft 96 has secured to it a worm 99 with which meshes a worm wheel 100, said worm wheel being positively connected with a bevel pinion 101 in mesh with two bevel pinions 102 103 respectively, which it drives simultaneously in opposite directions. These pinions are loosely mounted upon a shaft 104 upon which the gear 91 before-mentioned is secured. Each of the pinions 102 103 carries a clutch element 105 adapted to be engaged with complemental clutch elements on the opposite ends of a sleeve 106 which is slidingly mounted upon the shaft 104, and is caused to have simultaneous rotation therewith by a pin 107 passing through the shaft and sleeve. A rod 108 passes longitudinally through the shaft 104 and engages said pin so that when reciprocated, it will move the clutch sleeve 106 into or out of engagement with either of the clutch elements 105. The rod is moved by a bell crank 109 pivoted to the front of the machine, and having on one of its arms a roll 110 engaged between flanges of a collar 111 secured to the rod. The outer end of the bell crank carries a handle 112 by which it may be manipulated, and it is also connected through an intermediate block 113 (see Fig. 7) with a slide 114 which is engaged with a trip lever 115 pivotally mounted at one end and engaged with the slide by a pin on which is a roll 116 entering a notch in the slide. When the bell crank is in the position shown in Fig. 6, the forward pinion 103 is connected with the shaft and the bed is moved toward the left, while when the bell crank is moved to its extreme left-hand position, the rear pinion 103 is made fast to the shaft and the bed is driven toward the right. In the intermediate position of the bell crank, the clutch is midway between both pinions and out of engagement with both, so that the bed is not driven in either direction. The handle 112 provides for a manual reversal and disconnection of the table drive while an automatic reversal is effected by means of dogs carried by the lower bed or table.

The dogs consist each of a screw 117 threaded into a pivoted holder 118 which is pivotally mounted on a pin 119 passing through ears 120 on a block 121 which is slidingly mounted on the front edge of the reciprocating lower bed or table. This table and each of the parts of which it is composed has a slot 122, extending its entire length, in which is held the head of a stud 123 (Fig. 12) which passes through the block 121 and by means of clamping nuts 124, adjustably holds the latter in any position. When the pivoted holder 118 is swung out into the horizontal position, shown in Figs. 12 and 13, the dog travels in a path in which lies the trip lever 115. At least two dogs are employed in the ordinary operation of the machine, so that the lever is alternately engaged and moved in opposite directions by them, thereby reversing the drive in the manner above described. The location of the dogs of course determines the point at which the reversal takes place and may be varied according to the character of the work being done.

Preferably I employ more than one pair of dogs, and in Figs. 1 and 2 of the drawings, I have shown two pairs, any two of which may be used for effecting reversals or for stopping the machine. When either of the endmost dogs is to be used, one or both of the intermediate ones is swung upward about its pivot, so as to clear the stop lever or trigger 115, and therefore to be inoperative. The use of more than two dogs is of great advantage in grinding pieces having steps, that is, portions of different diameters, for the dogs may be set in position for effecting reversal at the points where the different steps occur. That is, one pair of dogs will be set for enabling the machine to grind the part of the work which projects the farthest, another dog or pair thereof may be set for the next step of the work, and so on, there being a dog adapted to reverse the work when each step thereof is at the grinding wheel, and when the grinding shifts from one step to another, the dog previously used may be rendered inoperative by simply swinging it up about its pivot, and another dog made operative, without changing the adjustment of any of the dogs. This insures uniformity of work, for one setting of the dogs is sufficient for an entire lot, and every piece of the lot will have its steps ground to exactly the same length. If only one pair of dogs were used in grinding stepped work, they would have to be re-adjusted for each new piece, and the consequent opportunity for error might result in lack of uniformity in the pieces of a lot, and would possibly spoil some of them. Another use of the plurality of dogs is to enable the machine to be automatically stopped when the work has been withdrawn from the grinder to a more remote point than that at which it is usually reversed. That is, a pair of the dogs is set so as to effect reversal when each end of the length or portion of the work to be ground reaches the point of reversal, and then a third dog at a different position is set so as to stop the feed automatically after the work has been removed to a more remote distance from the grinder, it being understood that before the third dog becomes operative, one of the reversing pair is swung up out of the way of the trip. To permit this disconnection of the feed, the bell crank 109 is constructed so that it may be automatically stopped in mid-position, with the clutch 106 disconnected from both pinions 103. For this purpose the handle 112 is provided with locking pins 125 (see Fig. 8) which are adapted to enter holes 126 in an apron which projects from the front of the machine frame. This handle is movable endwise on the end of the bell crank and carries on its inner end a flange 127 on which the pins 125 are mounted. There is a spring 128 inside the handle which bears against a shoulder 129 thereof and at its other end bears against the head 130 of a stud 131 which is screwed into the forwardly projecting arm of the bell crank. A slot 132 which is offset at one end and a pin 133 enable the handle to be held in its outer position against the force of the spring. When the pin is in the straight part of the slot, the pins 125 are in line with the holes 126 and the spring presses the handle rearward, tending to force these pins into the holes. Consequently as soon as the bell crank arrives at its mid-position, the pins automatically slip into the holes and the feed is disconnected. In order to connect the feed again, the handle is drawn out and turned so as to bring the pin 133 into the offset part of the slot, whereupon the pins 125 are out of line with the holes 126 and are also held away from them. The bell crank can then be swung in either direction. When the handle is released, its flange 127 is pressed against the apron but the pins 125 do not enter the holes 126 until the bell crank has been moved into mid-position, but in this position pins 125 are engaged in the complemental holes, and movement of the bell crank in either direction prevented.

The reciprocation of the work-carrying beds is effected at any desired speed by making any one of the loose gears 94 which is necessary to secure that speed, fast to the shaft 95. Any suitable means may be used for this purpose, such as a rod 34 traveling through a central bore of the shaft 95 and carrying a key (not shown), adapted to enter keyways in the hubs of the gears. A lever 136 having a handle by which it may be manipulated is provided for shifting the rod 134. This lever has a pivotally mounted tooth 137 contained between two collars 138 on the rod 134, and is itself pivoted to a stud 139. It swings over a segment 140 and has a locking pin 141 adapted to enter any one of the holes 142 of the segment, these holes being equal in number to the gears 94 and positioned so as to receive the locking stud whenever the key is in register with a gear. Stop pins 143 limit the swing of the lever in each direction. A hand drive for reciprocating the beds is also provided. This consists of a hand wheel 144 driving a gear 145 in mesh with the rack 92. The gear 145 is on a shaft 146 separate from the shaft of the hand wheel, but driven by the latter through the train of gears 147 148 149 150 (Fig. 6).

The cross feed of the carriage for feeding the work between cuts is effected by a feed screw 151 mounted on the cross feed carriage 7 and engaging a fixed nut 153. This feed screw may be turned manually by a wheel 154, and it is also moved gradually automatically by the reversing mechanism.

The slide 114 has a cam projection 155 with bevel faces on both sides, which, when moved in either direction, engages a roll pivoted to the end of a plunger 156, said plunger being normally held upward by a spring 157. Its lower end passes from a sleeve 158 into position to engage the end of a lever 159 pivoted at 160 to a bracket 161. This lever carries pivoted upon it a pawl 162, the toe 163 of which engages the teeth of a ratchet wheel 164 which drives the feed screw 151 through a gear train composed of the pinions 165, 166 and 167, the first of these being secured to the ratchet wheel and the last to the feed screw. At each reciprocation of the bar 114, the plunger is depressed, and the pawl 161 moved downward by the space of one tooth, thereby slightly turning the ratchet wheel and rotating the feed screw by a still smaller amount. The pawl and its lever are returned by a spring 168 contained in a sleeve 169 formed upon the bracket 161 and pressing upward upon a plunger 170 which bears against the under side of the lever. The thrust of the spring is taken by an adjustable abutment 171 threaded into the lower end of sleeve 169. The pawl is held yieldingly against the face of the ratchet wheel by a short arm or tooth 172 pressed upon by a spring-pressed plunger 173 held in a sleeve 174 formed on the lever 159. The head of the said plunger has a notch 175 into which the tooth or short arm 172 may be moved, and when so moved, the toe of the pawl is held away from the ratchet wheel and retained by the walls of the notch.

When the carriage is to be fed by hand, the pawl and ratchet feed is disconnected, either by swinging the pawl away from the ratchet or by disengaging the pinion 166 from the gear 167. To permit of this last disengagement, the pinion 166 is hung in a holder 176 which is pivoted coaxially with the ratchet 164 and gear 165. It projects beyond the circumference of the ratchet and has a short slot 177 through which extends a screw clamp 178 by which it may be locked so as to hold the pinion 166 in mesh with the gear 167, or entirely out of contact therewith.

The machine is adapted for an automatic disconnection of the feed when the grinding has proceeded far enough. The means for so disconnecting the feed is a shield 179 carried by a disk 180 mounted so as to swing upon the shaft 181 to which the ratchet is secured. This shield is adjusted relatively to the ratchet by a pinion 182 on a stud 183 which is journaled in the disk, the pinion meshing with a gear 184 secured by screws 185 to the ratchet, and also engaged with the same key 186 which secures the ratchet upon the shaft. A handle 187 surrounds a square portion 188 of the stud 183, and enables the pinion 182 to be turned, thereby moving the shield into any position desired over the face of the ratchet. Accidental displacement of the shield is prevented by means of a friction disk 189 between the hub of the handle 187 and the disk 180. The amount of frictional resistance which this disk or washer interposes is governed by a nut 190 in the handle 187 which takes over a screw projection 191 on the stud 183. This nut bears against an internal shoulder in the handle and may be adjusted to cause the handle to press with more or less force against the friction washer. This means for adjusting the feed knock-off shield I consider one of the important features of the present invention.

There is automatic means for adjusting the spindle heads so as to effect an automatic feed of the grinding wheels as well as of the work, this automatic feed being substantially the same as described in my pending application referred to, with the addition of features as to means for holding the feed pawl out of engagement, and of adjusting the feed knock-off shield, which are the same as just described in connection with the carriage feed. The ratchet 192 on the feed screw 38, pawl 193, bar 194 having the two-sided cam 195, and the standards 196 on the bed for reciprocating the bar 194 are substantially the same as shown in said application. The lever 197 upon which the pawl 193 is pivotally mounted, has, however, a sleeve 198 in which is a plunger 199 pressed upward by a spring contained in the sleeve between the plunger and an abutment 200, said plunger being held against the short pointed arm or tooth 201 on the pawl. The head of this plunger also has a notch 202 by which to retain the pawl separated from the ratchet 192. The toe 203 of the pawl is a beveled block or rod set into the pawl and held by a set screw 204. The lever 197 is pivoted between its ends at 205 and normally pressed upward by a spring 206 which acts through a plunger 207. A screw 208 bearing under the arm 209 of lever 197 enables the pawl to be lowered, and thereby the movement imparted thereto by the cam 195 to be varied. Projecting over the ratchet is a shield similar in all respects as to its construction, mounting and manner of adjustment to that already described in connection with the feed for the work-holding carriage, so that further detailed description thereof is unnecessary.

The construction of either grinding wheel spindle and its bearing is illustrated in detail in Fig. 14. For convenience it may be assumed that the one here illustrated is the left-hand wheel 26 and the bearing 28. This bearing has a flange 210 and an annular rib 211 with bolt holes 212 by which it may be secured to the spindle head. The spindle to which the wheel is directly secured is designated by 213 and is held in bearing boxes or bushings 214 and 215 set into opposite ends of the sleeve or tubular bracket 28. The spindle 213 is separate from the main spindle 216 to which the driving belt 64 imparts its power, and is engaged therewith by a rib 217 on one contained in a slot of the other. The bushing 215 is tapered and is held in close engagement with a correspondingly internally tapered bore of the bearing by screw threads 217ª on the inner end of the bushing. Dust and grit are prevented from working in between the spindle and bushing by means of a dust lock consisting of a collar 218 fitting over the reduced outer end of the bushing and a disk 219 fitting over the end 220 of the spindle, which is reduced in diameter, and also in close engagement with the face of the collar 218 and the end of the bushing. An annular rib 221 projects from the face of the disk 219 into a correspondingly located and formed groove in the adjacent face of the collar, and the latter has a peripheral rib 222 overlying the rib 221. A clamp nut 223 is threaded on the end of the grinder spindle and clamps the grinding wheel against the disk 219, holding the latter closely enough against the collar 218 and end of the bushing 215 to leave the least possible space for particles dislodged from the work and wheel to work between them and into the bearing of the spindle. The nut has a sleeve or hub 224 taking over the part 220 of the spindle and fitting the bore of the grinding wheel.

The collar 218 is secured to the bushing by means of pins 225, so that the collar is prevented from rotating on the bushing and serves as a means to turn the latter for screwing it more or less into or out of the bearing. A lock nut 226 is threaded on the outer end of the bearing and engages the collar 218, thereby holding the bushing in any adjustment and preventing it from being turned by the friction of the disk against it.

A modified form of spindle bearing is shown in Fig. 17, in which the tubular bearing or bracket 28ª is practically the same as the sleeve previously described, except that its bore is tapered from end to end, and there is a single bearing box or bushing 227 which is inserted into the sleeve from the end of the latter which is attached to the spindle head, and is reduced in diameter gradually toward the outer end. This box is slotted at one side, having a longitudinal slot or groove 228 extending from its outer periphery to the bore in which the spindle is contained, which slot is provided so that the bushing may be crowded more or less tightly around the spindle to take up wear. A flange 229 is formed on the end of the bushing and screws 230 extend through the same into threaded engagement with the body of the tubular bracket, in order to force the bushing into the bracket. The engagement of the tapered exterior surface of the bushing with the tapered bore of the bracket crowds the walls of the slot 228 toward each other, and so reduces the diameter of the bore in which the spindle has its bearing, thereby enabling the bearing to fit the spindle exactly and prevent side-shake.

One of the important features of my invention is the construction of the work holders, or rather the brackets in which the rotating work-holding elements 15 and 17 have their bearings. The brackets 16 and 18 are the same in construction and a description of one will suffice for both. In Figs. 12 and 13 one of these brackets is shown in detail. It consists of a base 235 which is set upon the pivoted upper bed 13 and is guided thereon by a rib 236 and stud 237 the head of which is contained in an inverted T-shaped longitudinal slot of the bed. A tubular post 238 rises from the center of the base 235 and contains the headed stud. The main portion or head 16 of the bracket has a bore which receives the tubular post 238 and has a peripheral downwardly extending annular rib or flange 239 which surrounds a circular table on the top of the base 235. The bracket 16 is thus movable angularly about a vertical axis to permit adjustment of the axis of the work at a slant with respect to the travel of the bed and grinding wheel. This angularly adjustable part of the bracket contains the bearing 240 in which the shaft or stud 241 of the work holder is held. The bracket is locked in its various angular positions by a nut 242 threaded upon the exterior of the tubular post 234 and contained in a surrounding annular recess in the bracket. This nut is independent of the headed stud 237, which is independently clamped so as to secure the bracket in any position longitudinally of the bed, by means of a nut 243 bearing against the end of the post 238. Accordingly either the longitudinal or angular adjustment of the bracket may be made independently without disturbing the other adjustment. In order to locate the bracket with the axis of the work holder exactly in line with the direction of movement of the bed, a pin 244 is provided, which pin passes through the bracket and extends into a tapered hole 245 in the base 235. This enables the axis of the work holder to be brought into line without measurements or adjustments, and therefore without loss of time. If desired, other holes located so as to receive the pin when the bracket is at definite angles of adjustment may be provided, so that standard tapers may be ground in the work without loss of time in making the adjustments.

The bearing is taken up and caused to embrace the stud 241 without looseness, by means of bolts 246 passing through lips 247 248 on the split bearing. The bolt is threaded into the lip 248 and has a surrounding sleeve 249 pinned to it bearing against a wear-resisting nut 250 which is screwed into the lip 247 around the bolt, and is secured by a set screw 251.

On top of the bearing bracket is secured a bracket 253 having a split sleeve 254 in which is clamped a shaft 255 carrying a truing tool 256. This truing tool is a threaded bolt engaged with complemental screw threads in the interior of a transverse hole made near the end of the shaft 255, and in the end of the bolt 256 is secured a diamond holder 257 having set in its outer end a diamond 258 or any other hard substance capable of cutting away the surface of the grinding wheel. The shaft 255 is of such a length that it extends beyond the end of the work and the truing tool projects toward the grinding wheel over the work in such a position as to true off the face of the wheel after each cut and maintain its surface true and in condition for grinding. The shaft 255 is of such a diameter as to be very rigid, and is rigidly held in the split sleeve 254 by means of a bolt 259 which draws the sides of the sleeve into clamping engagement with the shaft. Also the end of the shaft which is provided with the threaded hole to contain the diamond holder is split, and the sides of the hole are drawn into gripping engagement with the bolt by means of a screw 260 which draws the divided members of the end together. This construction provides an extremely rigid means of support for the truing tool so that the same is prevented from chattering and caused to face off the grinding wheel smoothly. Furthermore, the fact that the truing tool is mounted in the end of a horizontal rotatable shaft enables it to be turned so that it will be exactly radial to the wheel as the work is fed and the grinding progresses.

I propose to provide the shaft 255 with grooves 261, and to form in the bearing therefor a pocket or recess 262 opening into the bore of the bearing sleeve and containing a ball 263. The inner end of the recess in which the ball is contained has a lip preventing escape of the ball into the interior of the bearing, and the latter is pressed against the lip by a spring 264 contained in the recess and engaging a screw abutment 265 threaded into the outer end of the recess. The spring presses the ball so that it enters any one of the grooves in the shaft, and thereby holds the shaft so that it cannot be moved longitudinally except by the expenditure of considerable force, but it may be turned rotarily with comparative ease. The grooves and ball enable the diamond holder to be swung out of the way when work is being removed from and put into the work holder, and then they enable the truing tool to be brought back into its former position without re-adjustment. For work of different lengths the shaft may be moved endwise until different grooves are brought into engagement with the ball.

It is possible by slightly modifying the machine to enable one piece of work to be simultaneously ground to different diameters by two grinding wheels extending toward the work from opposite ends. When work of this character is done, a single work holder capable of holding a piece with its bore open from end to end is used. Such a holder is illustrated in Fig. 20. The holder here is a sleeve 266 contained in bearings 267 and 268 formed in brackets 269 and 270 which are mounted upon the bed 13. The brackets are independent and may be moved toward and from each other to permit removal and re-placement of the work-holding sleeve. Between its ends the work holder is provided with a pulley 271 which is preferably located between the bearings and is driven by one of the belts, as 24. The sleeve after being placed in the bearings is held against end-shake by collars 272 which are secured externally upon it outside of the bearings 267 and 268. Inside the work holder the work piece is secured by clamping jaws or screws. Not only a single piece of work, but also separate pieces of the same or different sizes or characters may be independently mounted in the work holder 266 and simultaneously acted upon by the two grinding wheels. It will be noted that the work piece or pieces are in engagement with both wheels simultaneously during part of the time, and that the same movements of the work holder or holders in each case cause the work to travel back and forth in engagement with both wheels. At each reversal of movement of the work holder one of the tools is out of engagement with the work when tubular pieces are internally acted upon, but at other times both tools are simultaneously in action.

The arrangement of two tools acting on a single piece, enables the interior surfaces, when portions thereof are of different diameters, to be made truly co-axial, and is an advance in the art of grinding over previous machines which permitted only a portion of one diameter to be ground at any one time.

The necessary relative travel between the work and grinding wheel in order to bring the tool along the entire length of the surface to be ground can be effected by moving the grinding wheel longitudinally of its axis while the work holder remains in a stationary position. This movement is effected by the hand wheel 55, and in place of the automatic reversing mechanism for stopping the movement of the tool in this direction when the end of the surface to be ground is reached, I provide a stop 273 which is clamped upon the guideway 44 which supports the slides holding the spindle heads. This stop is adjustable and may be placed so as to arrest the movement of the slide when the wheel has been carried far enough into the work. For work pieces which have a plurality of internal steps, I propose to provide the stop with a number of elements of different lengths which may be adjusted in accordance with the locations of the steps so that the grinder may be arrested when it has penetrated into the work as far as each of the steps.

The construction of the bearing bracket 28 previously described furnishes a means by which a grinding machine having a grinder spindle supported at both ends, as illustrated in my preceding application Serial No. 385,007, filed July 22, 1907, may be converted into a two-grinder machine, such as forms the subject-matter of the present application. In the machine of the said application, as well as in the present machine, the grinder spindle is rotatably mounted in two tapered bearing boxes 275 between which is located the pulley 68 for driving the spindle. A bar rigidly held in similar bearing boxes and projecting toward the grinder spindle is employed to support the end of an arbor held in the grinder spindle on which the grinding wheel is mounted. When the supported spindle is replaced by two grinding wheels, the massive bar is removed, the clamping boxes in which the same is contained are taken out and replaced by others having bearings for a spindle, and a spindle having a driving pulley upon it is placed in these bearing boxes. A tubular bearing bracket is then clamped to the spindle head over the end of one of the boxes and projects toward the grinding wheel, supporting and bracing the projecting part of the spindle.

By the present invention I have devised a type of tubular spindle support which serves both to support an independent spindle passing through it and driven by a shaft contained in the bearing adjacent which said sleeve is supported, and also to support the end of a shaft or arbor bearing a grinding wheel, and driven from the remote spindle supported in the other set of boxes. In this connection I have invented also an improved form of grinder holder which may be readily disconnected from the spindle by which it is rotated. Fig. 20 illustrates the construction and arrangement by which independently driven spindles carrying two grinding wheels may be substituted for and replaced by a grinding wheel holder supported at both ends and carrying one grinding wheel. In this arrangement the right-hand spindle 216 is the driver and the bearing sleeve 28 contains no spindle but simply an internally tapered bushing 215$^a$ which provides a bearing for the shaft section or arbor on which the grinding wheel is mounted, and a spring 276 which yieldingly presses said bushing outward. The spindle here terminates just outside the inner bearing box 275, and has upon it a flange 277 which may be contained within the cavity formed in the head 210 of the right-hand tubular bearing 29, which is similar in construction to the tubular bearing shown in Fig. 14. This bearing is here removed, leaving the head 277 exposed. The grinding wheel 26$^a$ is mounted upon a shaft section 278 or arbor of sufficient diameter to be rigid, and is clamped between a fixed collar 279 and an adjustable collar 280. This shaft section has on one end a short stud 281 which enters a complemental socket in the end of the spindle, and it also has a collar or flange 282 through which screws 283 are passed and are threaded into tapped holes in the head or flange 277, for the purpose of communicating rotation from the spindle to the shaft. The tapered stud has so abrupt a taper that it will not bind in the spindle, and is provided simply for centering the shaft section 278 with respect to the spindle. The other end of this shaft section has a projection 284 entering the bushing 215ª. This latter bushing need not be internally tapered, but may be exactly like the bushing 215, in which case the same tubular bracket 28 may be used for both purposes, but I find it more convenient to have separate brackets for the two classes of work, as it is easier to remove one and substitute the other than it is to remove the grinding wheel 26 and spindle section 213 in preparation for receiving the stud 284 of the shaft section 278. The bushing 215ª is preferably arranged so that it may rotate within the sleeve 28, and the stud 284 of the grinder spindle or arbor has one or more laterally projecting pins 291 which enter notches in the end of the bushing and cause the same to turn with the arbor. These pins may be omitted if desired, and the bushing caused to turn by its frictional engagement with the stud. In any event, the support for the end of the arbor is capable of rotating and the arbor is thus supported at its ends by rotating bearings or supports, the right-hand support being the spindle section 216 which is driven. This capacity of the arbor bearing to revolve enables the arbor to revolve true and without heating in its bearing if it should be slightly sprung by the action of the clamping nut 280, or from other causes. The stud 284 is short so that it may act to a certain extent as a swivel joint and allow the arbor to accommodate itself in the bearings without causing the bearings to heat by an imperfect alinement of the arbor. By thus mounting the grinder arbor with a short connection in a revolving bearing bushing, the arbor may be held rigidly against end movement, and at the same time be permitted to revolve at high speed without heating or grinding the bearing, regardless of whether or not it is relatively straight or in actual alinement. Another advantage of having the bushing revoluble is that whereas dust and grit might work in between the arbor stud 284 and the bushing, it cannot get between the bushing and the inner surface of sleeve 28, because this bearing surface is protected by a cap 292 which extends over the ends of the sleeve and bearing and is perforated to receive the stud 284. This cap has slots to permit passage of the pins 291 when the stud 284 is inserted and removed. By turning the hand wheel 55 and moving the slide 50 backward, the arbor 278 may be removed and another one of any diameter or length with a coarser or finer wheel, according to the character of the work operated upon, may be substituted. When the single wheel 26ª is to be removed, the slide 50 carrying the left-hand spindle heads and tubular bracket is backed off clear of the shaft section and the latter by a slight movement endwise is clear of the spindle 216. As the taper of the stud 281 is sharp, the latter is not wedged in the spindle, but parts easily therefrom. The machine may then be made into a two-grinder machine by substituting tubular brackets, such as shown in Fig. 14, upon the inner ends of each spindle head, these brackets being provided with their spindles and wheels 26 and 27, respectively. The spindle section 213 which engages with the shaft or spindle section 216 in the right-hand head is provided with a flange, centering stud, and pins similar to the parts 282 281 and 283, previously described. These flanges are contained in the recess of the head 210 which is formed on the tubular bracket.

A modification of this construction capable of securing the same results is shown in Fig. 21. The arbor, grinding wheel, bearing sleeve or bracket and stud on the arbor which enters the bracket, are designated by the same numerals as before. The bearing for the stud 284 is a cylinder 215ᵇ which revolves in a sleeve 293 contained within the bracket 28 and held by a set-screw 294. On the outer end of the bearing is a flange 295 which protects the bearing surface from grit. On the clamp screw 280ª which holds the grinding wheel against the shoulder 279 of the arbor are longitudinally projecting pins 296 which enter holes in the flange 295 and cause the bearing cylinder to revolve with the arbor. A washer or plate 297 is secured to the inner end of this cylinder by a screw 298 and projects over the bushing 293 so as to prevent removal of the cylinder from the tubular bracket. The connection between the arbor and the right-hand spindle section 216 is made with a tapered head 299 on the projecting end of the spindle section which enters a socket 300 in the end of the arbor and has a threaded stud 301 screwed into a tapped hole in the arbor. This connection supports the arbor and at the same time transmits rotation thereto.

Another modification is shown in Fig. 22, in which the stud 284 of the grinder arbor revolves in the bearing 215ᶜ, which in turn is positively driven by the spindle section 216 in the left-hand head. The bearing bushing has a short stud shaft 302 having a tongue-and-slot connection with the spindle section 216 similar to that illustrated in Fig. 14. A nut 303 is screwed on the stud shaft in the enlarged head of the bearing bracket and prevents removal of the bushing therefrom. The arbor stud 284 is not connected with the bushing, but is free to rotate therein and the latter is also rotated by the spindle section 216. This enables the arbor and bearing bushing to be rotated at different speeds, the arbor having a greater velocity than the bushing so that there will not be any excessive friction and the grinding wheel may be driven at as high speed as desired without heating in its bearing. This enables the necessary rigid support to be given to the left-hand end of the arbor without heating. The connection of the right-hand arbor with the driving spindle section 216 at the right is made through a long tapered stud 304 on the spindle section, which engages in the arbor with a connection similar to that of a twist drill. A transverse aperture 304 is made in the arbor so that it may be disengaged from the spindle by driving a tapered pin through the aperture. Between the clamping nut 280 and the grinding wheel 26ᵃ are sleeves 305 of an external diameter approximately the same as that of the arbor to the right of the grinding wheel, whereby to add rigidity to the arbor.

One of the most important features of the present invention is a sizing tool, which causes the grinding to be interrupted independent of the means for interrupting the feed when the work has progressed to a certain predetermined point. This tool, is a diamond-pointed truing tool 285 similar to the truing tool 256, and is supported at such a height that it will engage the grinding wheel at the point where the same comes tangent to the work. The sizing tool is mounted in a sleeve 286 on a bracket 287 which has a base 288 supported on and clamped to a block 289 which is set either on the base of the work holder or table which supports the work holder. Consequently the truing tool partakes of the feeding movement of the work and is moved constantly nearer the grinding wheel as the feeding movement progresses. It projects over the end of the work in a similar manner as does the truing tool 256, but is substantially at right angles thereto. It is threaded into the sleeve 286 and clamped in any adjusted position by a bolt 290 which acts to draw the parts of the split sleeve together. The tool is adjusted so that it will travel across the face of the grinding wheel after the work has been ground down almost to the finished size, say, to within two or three-thousandths of an inch. When thus traveling across the wheel it reduces the diameter thereof as fast as the feed progresses, and thus prevents it from cutting any farther into the work. This sizing tool is of importance in that it furnishes an automatic means for stopping the progress of the grinding at a safe point before the work has been brought down to the required size, or before too much stock has been removed and is independent of wear on the wheel.

The range of work capable of being performed on this machine is not limited by the dimensions of the machine itself, for larger work pieces may be operated on than can be accommodated in the machine dimensioned and arranged as shown in the drawings, by elevating the brackets 81 carrying the cross slides on which the spindle heads are mounted, and elevating also the work holders. As the spindle head brackets are detachably mounted on the slides 43 and 50, they may be disconnected and lifted, and rising blocks may be inserted beneath them, these blocks being clamped to the slides, and the brackets being clamped to the blocks. Similarly the bases of the work holders may be lifted from the bed, and rising blocks inserted under them. As the belts by which the grinder spindles are rotated pass above the slides, they interpose no impediment to the raising of the spindle heads, and consequently do not limit the amount by which the capacity of the machine for larger work may be increased. The only limit to such increase is the distance by which the cross feed carriage can be moved forward, and the distance by which the slides carrying the spindle heads may be moved to the rear.

I claim:—

1. A grinding machine comprising, in combination, a bed, means for reciprocating said bed, two grinder spindles overhanging said bed parallel to the direction of reciprocation thereof and approximately in line with each other, grinding wheels mounted on the adjacent ends of said spindles and work-supporting means capable of holding different work pieces secured to said bed, the work pieces being thereby carried back and forth simultaneously, each in operative relation with one of said grinding wheels.

2. A grinding machine comprising, in combination, a bed, two grinder spindles extending toward one another from opposite directions, grinding wheels mounted on the adjacent ends of said spindles, a work holder mounted between said wheels, and automatic mechanism for reciprocating said holder in line with said spindles to carry the work held thereby back and forth in simultaneous operative relation with both said wheels.

3. A grinding machine comprising the combination of a longitudinally reciprocatory bed, automatic mechanism for reciprocating said bed, spindle heads projecting over said bed near the opposite ends thereof, grinder spindles mounted in said heads and extending therefrom longitudinally of the bed toward one another, grinding wheels secured to the adjacent ends of said spindles, and a work holder mounted on said bed intermediate said grinding wheels and moved thereby so as to carry the work operatively past the grinding wheels in simultaneous contact with both wheels.

4. A grinding machine comprising the combination of a longitudinally reciprocatory bed, spindle heads overhanging said bed near the opposite ends thereof, grinder spindles mounted in said heads and extending therefrom longitudinally of the bed toward one another, grinding wheels secured to the adjacent ends of said spindles, and means for supporting work pieces of different characters on said bed, said pieces being caused by the reciprocations of the bed to travel in operative relation with their respective grinding wheels simultaneously.

5. A grinding machine for internal work comprising the combination of a longitudinally reciprocatory bed, spindle heads overhanging said bed near the opposite ends thereof, grinder spindles mounted in said heads and extending therefrom longitudinally of the bed toward one another, grinding wheels secured to the adjacent ends of said spindles and adapted by their location to enter hollow work pieces, and means for supporting hollow work pieces on the bed, whereby such pieces are carried back and forth over their respective grinding wheels.

6. A grinding machine comprising the combination of a longitudinally reciprocatory bed, spindle heads overhanging said bed near the opposite ends thereof, grinder spindles mounted in said heads and extending therefrom longitudinally of the bed toward one another, grinding wheels secured to the adjacent ends of said spindles, means on said bed adapted to support independently work pieces of different shapes or sizes, each in operative relation with one of the grinding wheels, and automatic mechanism for reciprocally driving said bed whereby different operations may be performed automatically at the same time.

7. A grinding machine comprising separated spindle supports, two spindles rotatably held in said supports and projecting oppositely therefrom toward one another, grinding wheels mounted on the free ends of said spindles, and work-holding means intermediate said spindles and movable reciprocatively in a line parallel with the said spindles to carry work pieces back and forth in contact simultaneously with said grinding wheels, each being in contact with a separate wheel.

8. A grinding machine comprising separated spindle supports, two spindles rotatably held in said supports and projecting oppositely therefrom, toward one another, grinding wheels mounted on the free ends of said spindles, and work holding means intermediate said spindles; said work-holding means and spindles having relative back and forth longitudinal movements in a line parallel with said spindles, whereby the necessary relative travel of wheels and work is effected.

9. A grinding machine comprising separated spindle supports, two spindles rotatably held in said supports and projecting oppositely therefrom toward one another, grinding wheels mounted on the free ends of said spindles, combined with a work holder between said grinding wheels rotatably mounted at its ends and driven at its center, and a bed mounted to reciprocate in a line parallel with said spindles on which said work holder is mounted and by which it is caused to carry work back and forth in operative relation with the two wheels, said holder being adjustable about an axis perpendicular to its line of reciprocation for enabling tapered work to be ground.

10. A grinding machine for internal work comprising separated spindle supports, two spindles rotatably held in said supports and projecting oppositely therefrom, toward one another, grinding wheels mounted on the free ends of said spindles, work-holding means arranged and constructed to hold hollow work pieces in position to be entered by said wheels, and automatic mechanism for producing relative longitudinal reciprocating movement between the work-holding means and spindles respectively.

11. A grinding machine comprising separated spindle supports, two spindles rotatably held in said supports and projecting oppositely therefrom, toward one another, grinding wheels mounted on the free ends of said spindles, combined with a tubular work holder in which work may be held in position to be acted on simultaneously by both grinding wheels, bearings in which said holder is rotarily mounted near its ends, a rotating driver for said holder between said bearings, and a bed by which said bearings are supported.

12. A grinding machine comprising separated spindle supports, two spindles rotatably held in said supports and projecting oppositely therefrom, toward one another, grinding wheels mounted on the free ends of said spindles, a bed caused to reciprocate in the line of said spindles, and separate work holders mounted on said bed, each adapted to secure a work piece in position to be operated on by one of said wheels as said bed reciprocates.

13. A grinding machine comprising separated spindle supports, two spindles rotatably held in said supports and projecting oppositely therefrom, toward one another, grinding wheels mounted on the free ends of said spindles, a two-part bed mounted with capability of reciprocating in line with said spindles, a work holder supported on each part of said bed, each said holder having means for securing a separate work piece in position to be operated on by one of the tools, mechanism for reciprocating one part of said bed, and a detachable connection between the two parts whereby one is moved by the other, and the work pieces carried by said holders are reciprocated operatively past the wheels, in simultaneous action.

14. A grinding machine comprising a plurality of grinding wheels rotatably mounted, a plurality of work holders, equal in number to the grinding wheels and each adapted to hold work in operative relation to one of said wheels, means for rotating said wheels and the work pieces supported by said holders, and means for moving all of said work holders back and forth to cause travel of the various work pieces past their respective grinding wheels.

15. A grinding machine comprising a plurality of grinding wheels rotatably mounted, a plurality of work holders, equal in number to the grinding wheels and each adapted to hold work in operative relation to one of said wheels, means for rotating said wheels and the work pieces supported by said holders, a sub-divided bed, on each of the parts of which one of said work holders is mounted, mechanism for moving one of said parts back and forth, and detachable connections between the several parts of the bed.

16. A grinding machine comprising a grinding wheel, a work holder, means for rotating said wheel, means for moving said grinding wheel in the direction of its axis along the work, and means for moving the work holder back and forth in the same general direction.

17. A grinding machine comprising a bed on which work may be mounted, a guide parallel to and above said bed, a slide movable along said guide, bearings secured to said slide and overhanging said bed, a grinder spindle, mounted in said bearings and projecting at one end beyond the same, a grinding wheel secured to said spindle, and hand wheel accessible to an operator standing at the front of the machine and geared to said slide for moving the same and the spindle in the direction of the axis thereof along the work.

18. In a grinding machine, two separated spindle holders, an externally tapered split bearing box contained in each said holder, a grinder spindle rotatably mounted in said holder, said boxes being independently adjustable axially to take up looseness, a tubular bracket mounted on the side of said holder and projecting therefrom in axial alinement with said spindle and having an internal bearing, a spindle section contained in said bracket in driven connection with said spindle, and a grinding wheel secured to said spindle section beyond the projecting end of said bracket.

19. In a grinding machine, a spindle holder, a grinder spindle rotatably mounted in said holder, a tubular bracket or bearing sleeve detachably mounted on the side of said holder and projecting therefrom, said bracket or sleeve having an internal bearing bushing detachably threaded therein with its base in axial alinement with the said spindle, a spindle section rotatably contained in said bracket or sleeve in separable driven relation with said spindle, and a grinding wheel secured to said spindle section outside of the projecting end of said bracket.

20. In a grinding machine, spindle heads separated from each other, bearings held by said heads adapted to contain rotatable grinder spindles, a spindle in each of said heads, said spindles having on the ends thereof nearest to each other means for engaging and rotating spindle sections, and tubular brackets or bearing sleeves secured to said heads and projecting therefrom toward each other, said brackets having internal bearings in axial alinement with the spindles respectively.

21. In a grinding machine, separated heads, bearings in said heads having their axes parallel or approximately in line, tubular brackets or bearing sleeves secured to the heads projecting toward each other and located with their bores in line with the bearings in their respective heads, and a spindle section mounted rotatably in the bearings of each head, said brackets or sleeves having internal bearings adapted to receive spindle sections in driven connection with either first-named spindle section, and being detachable to permit substitution of other brackets, or for operation of the machine lacking one or both brackets.

22. In a grinding machine, a bearing sleeve or bracket having a head at one end and a central bore, a spindle section rotatably contained in said bore and projecting from the end of said sleeve or bracket, a grinding wheel secured to the projecting end of said spindle section, and a dust lock between said wheel and sleeve to exclude foreign matter from the spindle bearing.

23. In a grinding machine, a bearing sleeve or bracket having a head at one end and a central bore, a spindle section rotatably contained in said bore and projecting from the end of said sleeve or bracket, a grinding wheel secured to the projecting end of said spindle section, and a stationary and a rotary disk interposed between said wheel and the end of the sleeve having complemental interengaging ribs and grooves to exclude dust from the spindle bearing.

24. In a grinding machine, a bearing sleeve or bracket having a head at one end and a central bore, a bushing threaded into the bore and projecting beyond the end of said sleeve, an adjustable lock nut on the end of the sleeve, a disk pinned to said bushing and engaging said lock nut to limit the movement of the bushing, and a spindle having a bearing in said bushing.

25. In a grinding machine, a bearing sleeve or bracket having means at one end whereby it may be rigidly secured to a part of the machine and having a longitudinal passage flaring toward the outer end of the sleeve, an externally tapered bushing fitted into the flaring end of said passage and having a threaded engagement with the sleeve, a disk or flange secured to the end of said bushing and extending over the end of the sleeve, whereby the bushing may be screwed into or out of the sleeve, and an adjustable lock nut threaded externally on the end of the sleeve for limiting the movement of the bushing.

26. In a grinding machine, a bearing sleeve or bracket having means at one end whereby it may be rigidly secured to a part of the machine and having a longitudinal passage, a bushing contained in said passage and projecting from the outer end of the sleeve, a laterally projecting disk or flange secured to the projecting end of said bushing and having in its outer face an annular groove, a grinder spindle having a rotatable bearing in said bushing, a disk mounted on said spindle having an annular rib fitting into said groove, and a grinding wheel clamped on said spindle against said disk.

27. In a grinding machine, a spindle, a bearing in which said spindle is rotatably held, a sleeve or tubular bracket detachably secured on the end of said bearing in axial alinement with said spindle, a bearing bushing threaded into the outer end of said sleeve and having a collar, a lock nut threaded externally on the end of said sleeve and engaging said collar, a spindle section rotatably contained in the sleeve in detachable connection with said spindle, and a grinding wheel on the protruding end of said spindle section.

28. In a grinding machine, a bed or table, a work holder mounted upon said bed or table adapted to hold work pieces to be internally ground, a spindle head, a grinder spindle rotatably mounted in said head and projecting therefrom so as to enter the work, a grinding wheel secured to the projecting end of said spindle, a slide on which said spindle head is secured, said slide being movable so as to carry the grinder into and out of the work, a guide on which said slide is mounted and adapted to travel, and a stop adjustably secured on said guide in position to be engaged by said slide for limiting the movement of the grinder.

29. In a grinding machine for internal work, a rectilinear guideway, a slide mounted thereon, a spindle head secured to said slide, a spindle rotatably mounted in said head and projecting therefrom toward the work, a grinding wheel secured to the projecting end of said spindle, the slide being movable to carry said grinder into and out of the work, and a stop adjustably mounted in the path of said slide to arrest the same when the grinding wheel has proceeded to the inner limit of the part to be ground.

30. In a grinding machine for internal work, a rectilinear guideway, a slide mounted thereon, a spindle head secured to said slide, a spindle rotatably mounted in said head and projecting therefrom toward the work, a grinding wheel secured to the projecting end of said spindle, the slide being movable to carry said grinder into and out of the work, and a stop adjustably mounted in the path of said slide to arrest the same when the grinding wheel has proceeded to the inner limit of the part to be ground, said stop having displaceable elements movable into and out of the path of the slide, and each adapted to arrest the slide in a different position, whereby the wheel may be arrested with respect to a plurality of points on the work with one adjustment of the stop.

31. In a grinding machine for internal work, a rectilinear guideway, a slide mounted thereon, a spindle head secured to said slide, a spindle rotatably mounted in said head and projecting therefrom toward the work, a grinding wheel secured to the projecting end of said spindle, the slide being movable to carry said grinder into and out of the work, and a stop adjustably mounted in the path of said slide to arrest the same when the grinding wheel has proceeded to the inner limit of the part to be ground, said stop being constructed and arranged with provisions for arresting the tool in any one of a number of positions without re-adjustment.

32. In a grinding machine, a plurality of spindle heads, grinder spindles rotatably held in said heads, grinders secured to said spindles, a plurality of counter shafts equal in number to said spindle heads and grinders, a holder for each said countershaft, brackets on the machine on which said holders are supported and means whereby each counter shaft may drive the grinder spindle nearest to it.

33. In a grinding machine, in combination with a rotating grinding spindle and a grinding wheel secured thereon, a counter shaft, a belt driven by said counter shaft and engaging said spindle to drive the latter rotarily, a holder in which said counter shaft is mounted, and brackets on the machine frame extending perpendicularly to the axes of said spindle and counter-shaft, arranged to slide toward and from said spindle, whereby the tension of said belt may be adjusted.

34. In a grinding machine, a base or pedestal, brackets on said base, a counter shaft, a pulley thereon, a belt passing over said counter shaft for driving a rotating part of the grinding machine, and a holder for said counter shaft mounted to slide rectilinearly on said brackets in a direction transverse to the axis of the shaft, whereby the tension of said belt may be adjusted.

35. In a grinding machine, a base, brackets on said base, a rotary spindle, a counter shaft parallel to said spindle, a pulley thereon, a belt passing over said counter shaft for driving said spindle, a holder for said counter shaft mounted to slide rectilinearly on said brackets at right angles to the axis of said shaft and spindle, whereby the tension of said belt may be adjusted, and positive means for moving said holder in such a direction as will tighten the belt.

36. In a grinding machine, the combination of a spindle head, a grinder spindle rotatably contained in said head, a counter shaft having its axis parallel with that of said spindle, a drum thereon, a belt passing about said drum for driving said grinder spindle, a slide on which said spindle head is movable toward and from the counter shaft, and a slide on which the counter shaft is movable toward and from the spindle head, either the spindle head or the counter shaft being movable toward and from the other to adjust the tension of the belt.

37. In a grinding machine, the combination of a work holder, spindle heads on each side of said work holder, a grinder spindle rotatably supported in each spindle head, a grinding wheel secured to each said spindle, a counter shaft mounted parallel to each said spindle, a pulley on one counter shaft, a belt leading from said pulley to said adjacent grinder spindle for rotating the same, a drum on the other counter shaft, a belt leading therefrom for rotating the other grinder spindle, means for moving the head holding said latter grinder spindle longitudinally, whereby the belt is caused to travel longitudinally of said drum, and provisions for independently adjusting said counter shafts to take up the unequal stretch of the belts.

38. In a grinding machine, a work holder, a spindle head, a grinder spindle held in said head, a grinding wheel secured to said spindle, a slide upon which said spindle head is mounted, said slide being movable in the direction of the axis of said wheel and spindle, a counter shaft, and a driving belt leading from said counter shaft to the spindle, said belt being wholly above and clear of said slide, whereby the spindle head may be raised and secured at a higher elevation on the slide for increasing the capacity of the machine.

39. In a grinding machine, the combination of a reciprocating bed, a work holder clamped thereon, a spindle head, a grinder spindle held thereby and extending longitudinally of the bed, a grinding wheel secured to said spindle, a support on which said spindle head is mounted, and a driving belt for said spindle extending over said support, and being entirely clear of the same, said work holder and spindle head being held thereby separable from the bed and support respectively, and capable of being set on rising blocks to increase the capacity of the machine.

40. In a grinding machine, the combination of a guideway, two slides mounted and movable on said guideway, a spindle head secured to each slide, a spindle carried by each said head, an independent counter shaft beside each slide, a plurality of separate pulleys on one of said counter shafts adapted to be belted independently to the adjacent spindle for driving the same in definite positions of the slide on which said spindle is carried, and a drum on the other counter shaft belted to the spindle adjacent thereto for driving the adjacent spindle rotarily in any position within the limits of the length of the drum.

41. In a grinding machine, a spindle head, a grinder spindle carried thereby, a slide on which said head is mounted, said slide being movable in the direction of the axis of said spindle, a counter shaft, and a plurality of pulleys on said shaft either of which is adapted to be connected by belting with said spindle when the pulley on the latter is in the plane of the respective pulley.

42. In a grinding machine, a spindle head, a grinder spindle carried thereby, a slide on which said head is mounted, said slide being movable in the direction of the axis of said spindle, a counter shaft, and a plurality of pulleys on said shaft adapted to be connected by belting with said spindle when the pulley on the latter is in the planes of said pulleys respectively, said pulleys being loosely mounted on the shaft and adapted to be frictionally secured thereto.

43. In a grinding machine, a reciprocatory work-holding bed, a rotary grinder spindle having its axis parallel with the line in which said bed reciprocates, mechanism for reciprocatively driving said bed, a counter shaft supported on the machine frame, and connections from the same counter shaft for both driving said grinder spindle and actuating said bed driving mechanism.

44. In a grinding machine, a reciprocatory bed adapted to support the work pieces to be ground, a plurality of grinding spindles, a grinding wheel mounted upon each spindle with which the work is brought in contact by the reciprocations of the bed, driving shafts belted to said spindles for rotating the same, and mechanism driven by the same shaft which drives one of said spindles for effecting the reciprocal movements of the bed.

45. In a grinding machine, a rotating grinding wheel, a work support, means for giving relative longitudinal movements between said grinding wheel and work support, pawl and ratchet mechanism for effecting a relative transverse feeding movement of the tool and work, a shield extending over the periphery of said ratchet for disengaging the pawl when the cross feed has proceeded to the desired extent, a gear element secured to said ratchet having a series of teeth additional to the ratchet teeth, and a pinion engaged with said shield and in mesh with said gear element having a handle by which it may be rotated to adjust the position of said shield.

46. In a grinding machine, a cross feed mechanism including a feed screw, a ratchet for turning the same, and a pawl for rotating said ratchet step by step, a shield supported coaxially with said ratchet and extending over the periphery thereof for disabling the pawl after the ratchet has been turned through a predetermined distance, a circular series of teeth associated with the ratchet within the periphery thereof, and a pinion carried by said shield support in mesh with said teeth, whereby rotation of the pinion adjusts the position of the shield.

47. In a grinding machine, in combination with the depth feed mechanism, a ratchet, a pawl for turning the same step by step, a disk mounted coaxially with respect to said ratchet, a shield secured to said disk and projecting over the periphery of the ratchet, a series of teeth secured to said ratchet circularly about its axis, a stud journaled in said disk, a pinion on said stud meshing with said teeth, a flange on said ratchet extending over and protecting said pinion and a handle secured to said stud whereby the pinion may be turned, thereby adjusting the shield rotarily with respect to the ratchet.

48. In a grinding machine, in combination with the depth feed mechanism, a ratchet, a pawl for turning the same step by step, a disk mounted coaxially with respect to said ratchet, a shield secured to said disk and projecting over the periphery of the ratchet, a series of teeth secured to said ratchet circularly about its axis, a stud journaled in said disk, a pinion on said stud meshing with said teeth, a knob fitted over said stud in rotation-transmitting relation therewith, a friction washer interposed between said knob and the disk, and a nut threaded on said stud and bearing on said handle for producing friction between the latter and the washer, said washer serving to hold the pinion against accidental angular displacement, and thereby retaining the shield in any position of adjustment.

49. In a grinding machine, a work holder, a rotary grinder, means for producing relative reciprocation between the work and grinder in the direction of the axis of the latter, a feed screw for producing a relative transverse movement between the work and grinder at the end of each reciprocation, a ratchet secured to said screw, a pawl engaging said ratchet, a swinging arm to which said pawl is pivoted, a reciprocating cam element arranged to move said lever and pawl at each reversal of the relative reciprocating movement, and a spring-pressed stud bearing against a short pointed arm on said pawl for holding the toe of the pawl against the ratchet, said stud having a notch wherein said short pointed arm may be placed, and whereby the toe of the pawl may be held out of engagement with the ratchet.

50. In a grinding machine, a spindle head, a grinder spindle rotatably mounted in said head, a slide on which said head is movable transversely of the axis of said spindle, a screw for so moving said head, a ratchet secured to said screw, a pawl for actuating said ratchet, a pivoted lever on which said pawl is pivoted, a reciprocating bar having a cam element for oscillating said lever, and a screw bearing against one of the arms of the lever and adapted to adjust the lever so as to limit the movement and thereby the travel of the pawl which may be imparted by said cam.

51. In a grinding machine, a cross feed screw, a ratchet secured to said screw and pawl for moving said ratchet step by step, a lever to which said pawl is pivoted, means for oscillating said lever for actuating the pawl, a pointed projection on said pawl, and a spring-pressed pin carried by said lever normally bearing on said projection so as to hold the toe of the pawl in engagement with the ratchet, said stud having a notch to receive said projection when the pawl is swung away from the ratchet and to hold said pawl when so placed.

52. In a grinding machine, a carriage, a bed mounted on said carriage and adapted to reciprocate so as to carry the work back and forth past the grinding wheel, a feed screw for moving said carriage transversely of the reciprocatory movement of the bed, a pawl and ratchet mechanism movable step by step, a gear train between said pawl and feed screw, and a holder for one of the gears of said train mounted to swing about the axis of said ratchet for moving the gear carried thereby into and out of mesh.

53. In a grinding machine, a carriage, a bed mounted on said carriage and adapted to reciprocate so as to carry the work back and forth past the grinding wheel, a feed screw for moving said carriage transversely of the reciprocatory movement of the bed, a step-by-step driven ratchet wheel, a pinion rigidly connected therewith, a swinging holder mounted upon the axis of said ratchet and pinion, a second pinion carried by said holder in mesh with said first pinion, and a gear connected with said feed screw and adapted to be engaged by said second pinion, whereby motion is transmitted to the screw from the step-by-step driven ratchet, and a hand wheel connected with said feed screw, the swinging holder and pinion being movable to disconnect said gear from the ratchet train and permit manual rotation of the screw.

54. In a grinding machine, a carriage, a bed mounted on said carriage and adapted to reciprocate so as to carry the work back and forth past the grinding wheel, a feed screw for moving said carriage transversely of the reciprocatory movement of the bed, a ratchet wheel, a pawl operable to move said ratchet step by step, a pinion secured to said ratchet, a gear secured to said feed screw, an intermediate pinion adapted to mesh with said pinion and gear, a holder by which said intermediate pinion is carried, said holder being mounted to swing about the axis of the ratchet, whereby said intermediate pinion may be moved into and out of mesh with said gear, and a clamp for securing the said holder with the pinion either in or out of mesh with the gear.

55. In a grinding machine, the combination with a reciprocating bed, means for supporting work thereon, and a rotating grinder, of reversible driving mechanism for giving said bed reciprocal movements to carry the work past the grinder, said mechanism including a driving shaft, a series of gears of different diameters loosely mounted on said shaft, a parallel shaft, complemental gears fixed to said second shaft and of varying diameters, such as to permit engagement of each with one of the gears of the first series, a shifting key element, and means for manually shifting said key element to cause engagement thereof independently with any one of said first series of gears.

56. In a grinding machine, the combination with a reciprocating bed, means for supporting work thereon, and a rotating grinder, of reversible driving mechanism for giving said bed reciprocal movements to carry the work past the grinder, said mechanism including parallel shafts, a series of gears of different diameters secured to one of said shafts, a series of complemental gears each meshing with one of said first gear series and loosely mounted on the other shaft, said latter shaft and the loose gears thereon having keyways, a longitudinally movable rod contained in said second shaft, and a key carried by said rod and adapted to be brought by the longitudinal movement of the latter into engagement with the several loosely mounted gears in turn.

57. In a grinding machine, the combination with a reciprocating bed, means for supporting work thereon, and a rotating grinder, of reversible driving mechanism for giving said bed reciprocal movements to carry the work past the grinder, said mechanism including a plurality of gear trains of varying speed ratios, a shaft on which one of the gears of each of said trains is loosely mounted, said shaft having a longitudinal slot, a longitudinally movable rod contained in said shaft, and a key carried by said rod and yieldingly projected through the said slot, said key being brought into engagement with the loosely mounted gears individually by a longitudinal movement of the rod.

58. In a grinding machine, the combination with a reciprocating bed, means for supporting work thereon, and a rotating grinder, of reversible driving mechanism for giving said bed reciprocal movements to carry the work past the grinder, said mechanism including a plurality of gear trains of varying speed ratios, a shaft upon which one gear of each said train is loosely mounted, said shaft having a longitudinal slot, and the gears thereon having keyways, a rod contained within said shaft and longitudinally movable therein, a key carried by said rod adapted to be projected through the slot in the shaft and to be brought by movement of the rod into engagement successively with the gears, and an operating lever pivoted at the front of the machine and engaged with said rod, whereby the rod and key may be operated.

59. In a grinding machine, the combination with a reciprocating bed, means for supporting work thereon, and a rotating grinder, of reversible driving mechanism for giving said bed reciprocal movements to carry the work past the grinder, said mechanism including a plurality of gear trains of varying speed ratios, a shaft upon which one gear of each said train is loosely mounted, said shaft having a longitudinal slot, and the gears thereon having keyways, a rod contained within said shaft and longitudinally movable therein, a key carried by said rod adapted to be projected through the slot in the shaft and to be brought by movement of the rod into engagement successively with the gears, an operating lever pivoted at the front of the machine and engaged with said rod, whereby the rod and key may be operated, and means for locking said lever in a number of different positions, each of which corresponds with the engagement of said key with one of the gears.

60. In a grinding machine, the combination with a reciprocating bed, means for supporting work thereon, and a rotating grinder, of reversible driving mechanism for giving said bed reciprocal movements to carry the work past the grinder, said mechanism including a plurality of gear trains of varying speed ratios, a shaft upon which one gear of each said train is loosely mounted, said shaft having a longitudinal slot, and the gears thereon having keyways, a rod contained within said shaft and longitudinally movable therein, a key carried by said rod adapted to be projected through the slot in the shaft and to be brought by movement of the rod into engagement successively with the gears, an operating lever pivoted at the front of the machine and engaged with said rod, whereby the rod and key may be operated, a segment arranged adjacent to said lever, and a lock carried by the lever adapted to engage said segment and hold the lever stationary when the latter is in position to put said key in engagement with any of the gears.

61. In a grinding machine, the combination with a reciprocating bed, means for supporting work thereon, and a rotating grinder, of reversible driving mechanism for giving said bed reciprocal movements to carry the work past the grinder, said mechanism including a plurality of gear trains of varying speed ratios, a shaft upon which one gear of each said train is loosely mounted, said shaft having a longitudinal slot and the gears thereon having keyways, a rod contained within said shaft and longitudinally movable therein, a key carried by said rod adapted to be projected through the slot in the shaft and to be brought by movement of the rod into engagement successively with the gears, an operating lever pivoted at the front of the machine and engaged with said rod, whereby the rod and key may be operated, a segment rigidly mounted beside said lever having a series of locking recesses, and a lock carried by said lever adapted to be engaged with such recesses, the latter being located so that when any one is engaged by said lock, the key is in engagement with one of the gears.

62. In a grinding machine, the combination of a rotary grinding wheel, a work holder, and means for producing a relative movement between the grinding wheel and work holder in the direction of the axis of said wheel at different speeds, said means including a driving and a driven shaft, a series of gears of different diameters secured to one of said shafts, a series of complemental gears loosely mounted upon the other shaft, and manually operated means for connecting any of said loose gears with its shaft and disconnecting the same therefrom during the continuance of the relative movement between the work holder and grinder.

63. In a grinding machine, the combination of a rotary grinding wheel, a work holder, and means for producing a relative movement between the grinding wheel and work holder in the direction of the axis of said wheel in different speeds, said means including a driving and a driven shaft, a series of gears of different diameters secured to one of said shafts, a series of complemental gears loosely mounted upon the other shaft, a retractable key movable longitudinally of said shaft, means for so moving said key, and yielding means tending to project the key into engagement with the loosely mounted gears.

64. In a grinding machine, the combination of a rotary grinding wheel, a work holder, and means for producing a relative movement between the grinding wheel and work holder in the direction of the axis of said wheel at different speeds, said means including a driving and a driven shaft, a series of gears of different diameters secured to one of said shafts, a series of complemental gears loosely mounted upon the other shaft, a retractable key movable longitudinally of said shaft, means for so moving said key, and yielding means tending to project the key into engagement with the loosely mounted gears, said gears having grooves or slots to receive the key, and the latter being beveled at its ends so as to be retracted when moved into the bore of any gear when the slot in the latter is out of registry with the key.

65. In a grinding machine, the combination of a rotary grinding wheel, a work holder, and means for producing a relative movement between the grinding wheel and work holder in the direction of the axis of said wheel at different speeds, said means including a driving and a driven shaft, a series of gears of different diameters secured to one of said shafts, a series of complemental gears loosely mounted upon the other shaft, said shaft having a longitudinal groove, a key movable longitudinally of the shaft in said groove and yieldingly mounted so that it may be retracted into the groove, means for projecting the said key into engagement with the gears, the latter each having a groove or keyway to receive the key, and collars surrounding said shaft between the gears, said key being beveled at its ends, whereby it may be retracted, when moved longitudinally, out of engagement with one gear before being projected into the keyway of the adjacent gear.

66. In a grinding machine, a longitudinally reciprocable bed, reversible driving mechanism for reciprocating said bed in opposite directions, a lever for reversing said mechanism, and an automatic lock on said lever for holding the same in position to disconnect said driving mechanism.

67. In a grinding machine, a longitudinally reciprocable bed, reversible driving mechanism for reciprocating said bed in opposite directions, a lever for reversing said mechanism arranged so as to disconnect said driving mechanism before reversing the same, and an automatic lock carried by said lever adapted to arrest and retain the same in position to disconnect said driving mechanism.

68. In a grinding machine, a reciprocable bed, oppositely moving driving elements, a driven element, a clutch for connecting said driven element with either of said driving elements, a lever connected with said clutch for moving the latter alternately into engagement with said driving elements, and being adapted when in mid-position to hold the clutch out of engagement with either, and a trip carried by said lever arranged to arrest it automatically when in mid-position.

69. In a grinding machine, a longitudinally reciprocable bed, a reversible driving element therefor, continuous and oppositely moving driving members, a clutch connected with said driving elements movable into clutching engagement alternately with said driving members, a lever for so moving said clutch, a yielding locking element carried by said lever, and a complemental lock with which said locking element is adapted to engage automatically when the lever is in such a position as to hold the clutch out of engagement with either driving members.

70. In a grinding machine, a longitudinally reciprocable bed, means for reciprocating the same, including oppositely moving driving elements, a clutch movable into engagement alternately with each, a lever connected with said clutch for moving the same, a sleeve mounted to move longitudinally on said lever having projections, a stationary abutment adjacent to said sleeve having recesses to receive said projections, and a spring acting upon said sleeve for moving said projections into said recesses to hold the lever stationary when the clutch is out of engagement with both driving elements.

71. In a grinding machine, a longitudinally reciprocable bed, means for reciprocating the same, including oppositely moving driving elements, a clutch movable into engagement alternately with each, a lever connected with said clutch for moving the same, a handle on said lever having locking projections, a plate adjacent to said lever having recesses to receive said projections when the lever is in such a position as to hold the clutch out of engagement with both driving elements, and a spring engaging said lever and handle with a tendency to hold the latter against said plate and slip the same into the recesses.

72. In a grinding machine, a longitudinally reciprocable bed, means for reciprocating the same, including oppositely moving driving elements, a clutch movable into engagement alternately with each, a lever connected with said clutch for moving the same, a handle on said lever having locking projections, a plate adjacent to said lever having recesses to receive said projections when the lever is in such a position as to hold the clutch out of engagement with both driving elements, and a spring engaging said lever and handle with a tendency to hold the latter against said plate and slip the same into the recesses, said handle and lever having means for holding the handle against the tension of the spring out of engagement with said plate.

73. In a grinding machine, in combination with a reciprocable bed and reversible driving mechanism therefor, a pivotally mounted lever for effecting reversal of said mechanism, a sleeve longitudinally movable on said lever having projections on one end extending toward the pivot of the lever, a stationary member adjacent to said projections, a spring engaging said sleeve and lever with tendency to move the sleeve into contact with said stationary member, and complemental locking elements on said lever and sleeve for retaining the latter out of engagement with the rigid member.

74. In a grinding machine, in combination with a reciprocable bed and reversible driving mechanism therefor, a pivotally mounted lever for effecting reversal of said mechanism, a sleeve longitudinally movable on said lever having projections on one end extending toward the pivot of the lever, a stationary member adjacent to said projections, a spring engaging said sleeve and lever with tendency to move the sleeve into contact with said stationary member, and a pin on the lever entering a longitudinal slot in the sleeve, permitting movement thereof, said slot being offset at one end to receive the pin and thereby hold the sleeve out of engagement with the rigid member.

75. In a grinding machine, a longitudinally reciprocating bed, reversible mechanism for driving said bed, a trip for reversing said mechanism, a pair of adjustable dogs carried by said bed for alternately engaging and moving said trip, and thereby effecting reversal of the bed at predetermined positions, and a supplemental dog carried by said bed at another point for reversing the bed when in a third position.

76. In a grinding machine, a longitudinally reciprocating bed, reversible mechanism for driving said bed, a trip for reversing said mechanism, and a plurality of pairs of adjustable dogs carried by said bed, said dogs being adapted to swing in such position as to engage and operate said trip, and different pairs of dogs being independently usable for effecting reversal of the bed at a variety of points.

77. In a grinding machine, the combination of a grinding wheel, a reciprocable bed, a work holder, reversible driving mechanism for reciprocally moving said bed to effect a relative back and forth longitudinal movement between the work and grinder, a trip for reversing said mechanism, a pair of dogs carried by said bed in position to move said trip back and forth and thereby reverse the direction of movement of the bed, one of said dogs being adapted to swing out of the way of said trip, a locking device operated by said trip for disabling the driving mechanism, and a third dog for operating said locking device and stopping the motion of the bed when the same is in a third position.

78. In a grinding machine, a reciprocating bed, a grinding wheel, means for supporting work pieces on said bed in position so that the work may be carried back and forth past the grinding wheel by the movements of the bed, reversible driving mechanism for imparting such movements to the bed, a trip beside the bed for reversing said mechanism, and a plurality of dogs adjustably mounted on the bed in position to strike said trip to effect reversals of the driving mechanism in the course of the movements of the bed, said dogs being mounted so as to be shiftable out of the way of the trip without altering the adjustment thereof, and there being a plurality of pairs of such dogs, whereby the work may be moved back and forth in different positions without changing the adjustment of the dogs.

79. In a grinding machine, in combination with a longitudinally reciprocating bed and reversible driving mechanism therefor, a dog for reversing said driving mechanism, said dog consisting of a block clamped to the bed and adjustable longitudinally thereof, a holder pivoted to said block so as to swing inward and outward with respect to the bed, and a stop adjustably held in said holder.

80. In a grinding machine, a work holder consisting of a base, a bracket rotatably mounted on said base having a bearing, and a stud rotatably contained in said bearing carrying means for clamping a work piece.

81. In a grinding machine, a bed having a longitudinal undercut groove, a headed bolt arranged with its head in said groove, and a shank projecting above said table, a work holder consisting of a base having an aperture to receive said bolt and a tubular post surrounding the bolt, a bracket set on said base surrounding and adjustable rotarily about said post, a clamping nut screwed on the end of said post and bearing against said bracket for holding same in its various adjustments, and a nut threaded on the end of said bolt and bearing against said post for maintaining the work holder in its adjustments longitudinally of the bed, said adjustments being independent of one another.

82. In a grinding machine, a grinding wheel, a work holder, means for producing relative movement between said work holder and grinding wheel in the direction of the axis of the latter, means for producing a relative transverse feeding movement, and means independent of the wear on the tool for interrupting the grinding without stopping such transverse feed when the grinding has proceeded to a predetermined point.

83. In a grinding machine, a grinding wheel, a work holder, means for producing relative movement between said work holder and grinding wheel in the direction of the axis of the latter, means for producing a relative transverse feeding movement, and a tool mounted so as to partake of the movements of the work holder and located in position to remove the surface of the grinding wheel and prevent further grinding when the transverse feed has proceeded to a predetermined point.

84. In a grinding machine, a frame consisting of a base or pedestal, columns rising from each side of said pedestal, a transverse beam extending across and supported by said columns, said columns and beam inclosing an open space and the beam being provided with a guideway, and a cross-feed carriage in such open space.

85. In a grinding machine, a frame consisting of a pedestal or base, columns rising therefrom on opposite sides thereof, a beam extending horizontally across and supported by said columns and having a guide way, a spindle head mounted upon said guideway, brackets extending laterally from said beam, a shaft-holder, adjustably supported on said brackets, and a spindle-driving shaft rotatively held by said shaft-holder.

86. In a grinding machine, a base or pedestal, a carriage supported on said pedestal and having a feed movement, columns rising from the pedestal on each side of said carriage, a horizontal beam supported upon said columns and extending over the carriage at right angles to the feed movement thereof, said beam having a continuous guideway from end to end, slides mounted on said guideway, spindle heads supported on said slides, and a work holder supported on said carriage intermediate said spindle heads, and movable thereon parallel to said beam.

87. In a grinding machine a base or pedestal, a carriage supported on said pedestal and having a feed movement, columns rising from the pedestal on each side of said carriage, a horizontal beam supported upon said columns and extending over the carriage transversely of the direction of feed movement thereof, said beam having a continuous guideway from end to end, slides mounted on said guideway, spindle heads supported on said slides, a work holder supported on said carriage intermediate said spindle heads and having a traversing movement thereon parallel to said beam, brackets extending horizontally rearward from said beam, and counter shaft supports mounted slidingly on said brackets.

88. In a grinding machine, a base or pedestal, columns rising from opposite sides of said pedestal, a horizontal beam supported by the upper ends of said columns and extending from one to the other and provided with a longitudinal guideway, a slide mounted on said guideway, a bracket supported by said beam and extending downwardly and forwardly therefrom, a shaft supported by said bracket, a hand wheel on the forward end of said shaft, and gearing operated by said shaft and engaged with said slide for reciprocating the same.

89. In a grinding machine, a base or pedestal, columns rising from opposite sides of said pedestal, a horizontal beam supported by said pedestal and provided with a longitudinal guideway, a slide mounted on said guideway, a bracket supported by said beam and extending downwardly and forwardly therefrom, a shaft supported by said bracket, a hand wheel on the forward end of said shaft, gearing operated by said shaft and engaged with said slide for reciprocating the same, a spindle head supported on said guide, a spindle rotatably mounted in said head, brackets extending rearwardly from said beam, a counter shaft support mounted slidably on said brackets, a counter shaft held by said support, and a belt surrounding said counter shaft and spindle for transmitting rotation from the former to the latter.

90. In a grinding machine for internal work, a work-holder having means for securing a tubular work piece, spindle heads at each side of said holder, spindle sections rotatably mounted in said heads in line with each other and the work, and detachable tubular bearing brackets or sleeves separably attached to said heads and extending toward the work-holder, said sleeves serving as bearings for spindle sections.

In testimony whereof I have affixed my signature, in presence of two witnesses.

JOHN BATH.

Witnesses:
 ARTHUR H. BROWN,
 PETER W. PEZZETI.